US012665730B2

(12) United States Patent
Luo et al.

(10) Patent No.: US 12,665,730 B2
(45) Date of Patent: Jun. 23, 2026

(54) ALIGNING APPLICATION TIME OF MAC-CE-BASED ACTIONS FOR MULTIPLE USER EQUIPMENTS

(71) Applicant: Qualcomm Incorporated, San Diego, CA (US)

(72) Inventors: Jianghong Luo, Skillman, NJ (US); Navid Abedini, Basking Ridge, NJ (US); Hung Dinh Ly, San Diego, CA (US); Linhai He, San Diego, CA (US); Sherif Elazzouni, San Diego, CA (US); Naeem Akl, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 373 days.

(21) Appl. No.: 18/446,359

(22) Filed: Aug. 8, 2023

(65) Prior Publication Data

US 2025/0055653 A1 Feb. 13, 2025

(51) Int. Cl.
*H04L 5/00* (2006.01)
*H04L 1/1867* (2023.01)

(52) U.S. Cl.
CPC .......... *H04L 5/0092* (2013.01); *H04L 1/1896* (2013.01)

(58) Field of Classification Search
None
See application file for complete search history.

(56) References Cited

U.S. PATENT DOCUMENTS

| | | | | |
|---|---|---|---|---|
| 2020/0314885 A1* | 10/2020 | Cirik | ..................... | H04L 5/0048 |
| 2022/0052779 A1* | 2/2022 | Ye | .......................... | H04W 72/23 |
| 2023/0049043 A1* | 2/2023 | Li | .......................... | H04L 1/1864 |
| 2023/0144930 A1* | 5/2023 | Bhatoolaul | .......... | H04L 1/1812 370/328 |
| 2024/0284428 A1* | 8/2024 | Farag | .................... | H04L 5/0048 |
| 2025/0310963 A1* | 10/2025 | Fu | .......................... | H04L 1/1812 |

OTHER PUBLICATIONS

3GPP TS 38.133, "3rd Generation Partnership Project; Technical Specification Group Radio Access Network; NR; Requirements for support of radio resource management (Release 18)", 3GPP TS 38.133, V18.2.0, Jun. 2023, pp. 1-5215.
3GPP TS 38.321: "3rd Generation Partnership Project; Technical Specification Group Radio Access Network; NR; Medium Access Control (MAC) protocol specification (Release 17)", 3GPP TS 38.321, V17.5.0, Jun. 2023, pp. 1-251.

* cited by examiner

*Primary Examiner* — Saad Khawar
(74) *Attorney, Agent, or Firm* — Dinsmore & Shohl LLP

(57) ABSTRACT

Certain aspects of the present disclosure provide techniques for techniques for determining when to perform medium access control (MAC) control element (CE) (MAC-CE) triggered actions across multiple user equipments (UEs). A method includes receiving a MAC-CE comprising an indication to perform one or more actions and an indication of an absolute application time; and based on receiving the MAC-CE, perform the one or more actions at the absolute application time.

28 Claims, 17 Drawing Sheets

A method for wireless communications by an apparatus

Receive a MAC-CE comprising an indication to perform one or more actions and an indication of an absolute application time ⟍1105

Perform, based on receiving the MAC-CE, the one or more actions at the absolute application time ⟍1110

1100

A method for wireless communications by an apparatus

Receive a MAC-CE comprising an indication to perform one or more actions and an indication of an absolute application time

~1105

Perform, based on receiving the MAC-CE, the one or more actions at the absolute application time

~1110

1100

A method for wireless communications by an apparatus

Transmit a MAC-CE comprising an indication to perform one or more actions and an indication of an absolute application time

1205

Perform, based on transmitting the MAC-CE, the one or more actions at the absolute application time

1210

1200

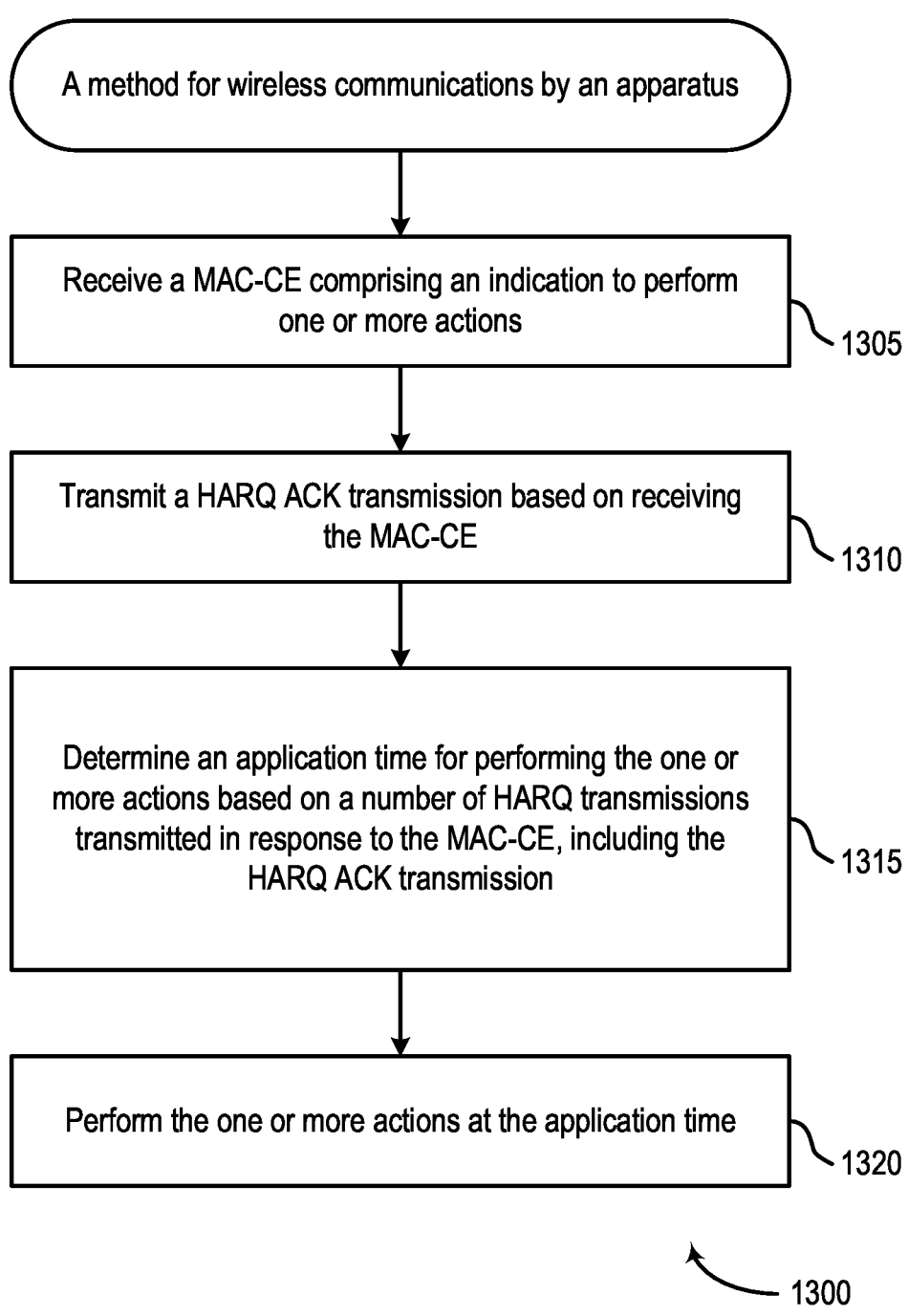

A method for wireless communications by an apparatus

Receive a MAC-CE comprising an indication to perform one or more actions

1305

Transmit a HARQ ACK transmission based on receiving the MAC-CE

1310

Determine an application time for performing the one or more actions based on a number of HARQ transmissions transmitted in response to the MAC-CE, including the HARQ ACK transmission

1315

Perform the one or more actions at the application time

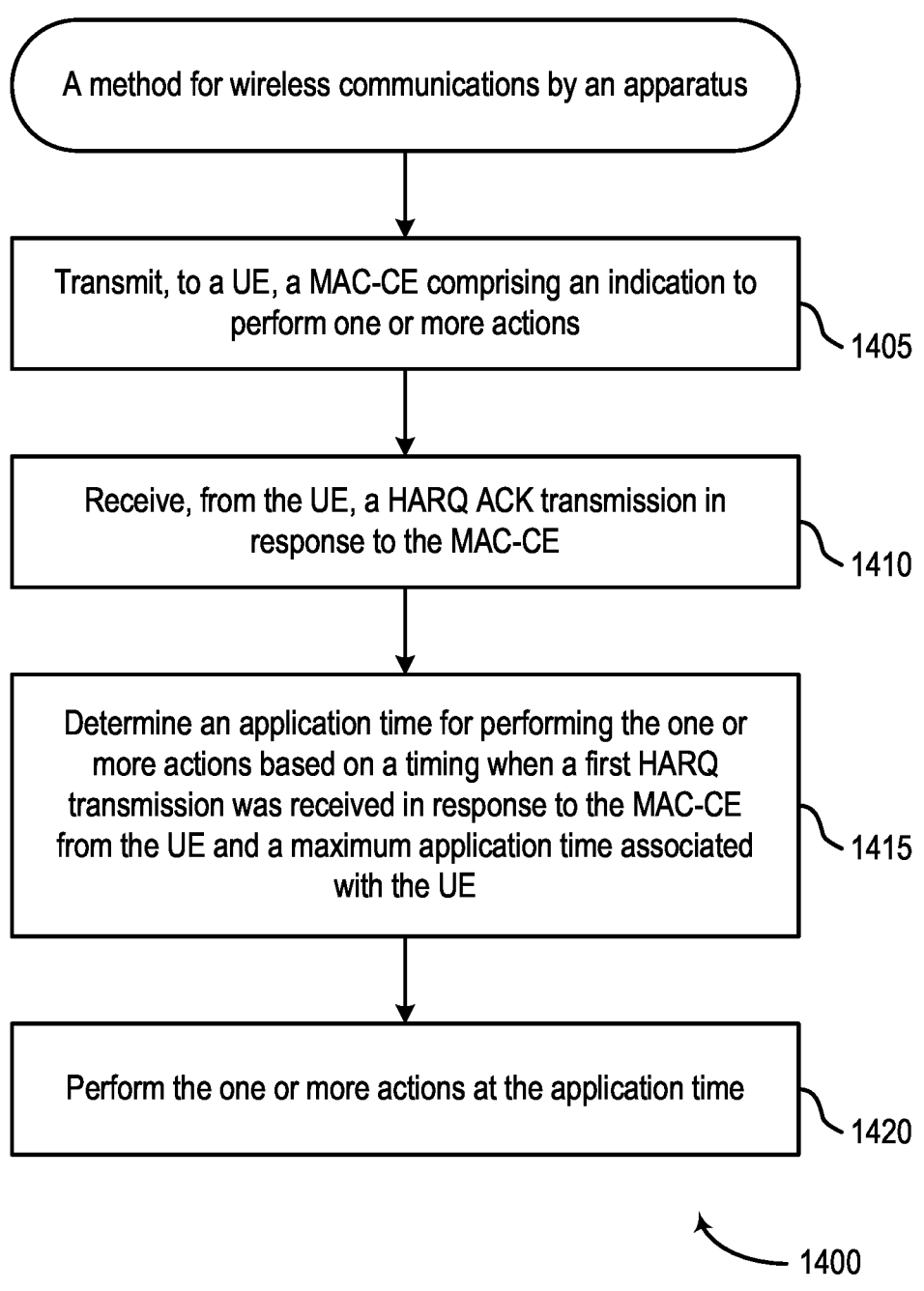

A method for wireless communications by an apparatus

Transmit, to a UE, a MAC-CE comprising an indication to perform one or more actions

1405

Receive, from the UE, a HARQ ACK transmission in response to the MAC-CE

1410

Determine an application time for performing the one or more actions based on a timing when a first HARQ transmission was received in response to the MAC-CE from the UE and a maximum application time associated with the UE

1415

Perform the one or more actions at the application time

ALIGNING APPLICATION TIME OF MAC-CE-BASED ACTIONS FOR MULTIPLE USER EQUIPMENTS

BACKGROUND

Field of the Disclosure

Aspects of the present disclosure relate to wireless communications, and more particularly, to techniques for determining when to perform medium access control (MAC) control element (CE) (MAC-CE) triggered actions across multiple user equipments (UEs).

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a user equipment. The method includes receiving a medium access control element (MAC-CE) comprising an indication to perform one or more actions and an indication of an absolute application time; and based on receiving the MAC-CE, perform the one or more actions at the absolute application time.

Another aspect provides a method for wireless communications at a network entity. The method includes transmitting a MAC-CE comprising an indication to perform one or more actions and an indication of an absolute application time; and based on transmitting the MAC-CE, perform the one or more actions at the absolute application time.

Another aspect provides a method for wireless communications at a user equipment. The method includes receiving a MAC-CE comprising an indication to perform one or more actions; transmitting a hybrid automatic repeat request (HARQ) acknowledgement (ACK) transmission based on receiving the MAC-CE; determining an application time for performing the one or more actions based on a number of hybrid automatic repeat request (HARQ) transmissions transmitted in response to the MAC-CE, including the HARQ ACK transmission; and performing the one or more actions at the application time.

Another aspect provides a method for wireless communications at a network entity. The method includes transmitting, to a user equipment, a MAC-CE comprising an indication to perform one or more actions; receiving, from the user equipment, a HARQ ACK transmission in response to the MAC-CE; determining an application time for performing the one or more actions based on a timing when a first HARQ transmission was received in response to the MAC-CE from the user equipment and a maximum application time associated with the user equipment; and performing the one or more actions at the application time.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 13 depicts another method for wireless communications.

FIG. 14 depicts another method for wireless communications.

DETAILED DESCRIPTION

Figure 1:
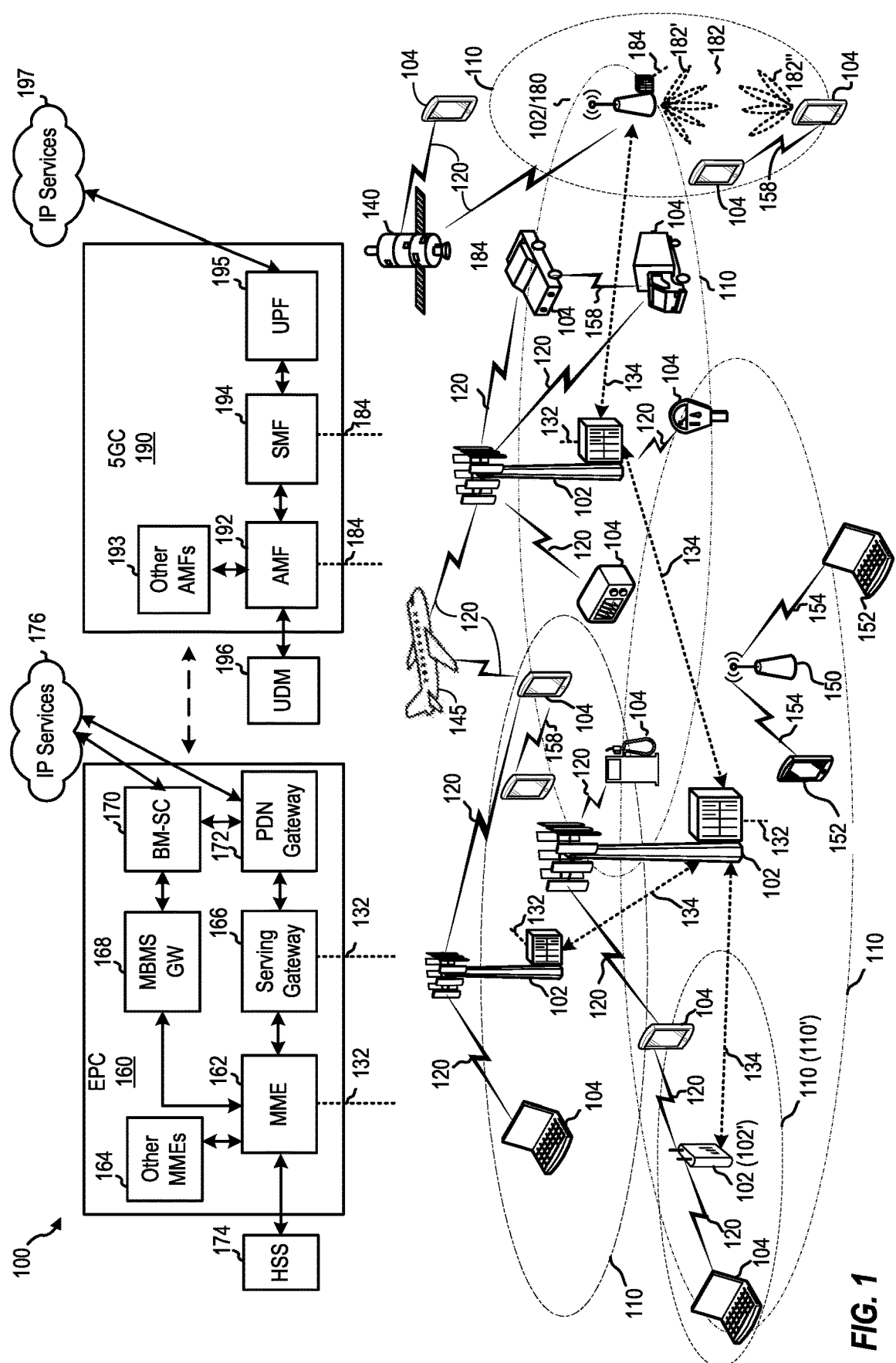
FIG. 1 depicts an example wireless communications network.

Aspects of the present disclosure relate to techniques for synchronizing the application time of medium access control (MAC) control element (CE) (MAC-CE)-based actions across multiple user equipments (UEs). Examples of such MAC-CE-based actions include, but are not limited to, the activation and/or deactivation of secondary cells (SCells), the activation and/or deactivation of uplink transmission configuration indication (TCI) states (e.g., uplink TCI state switching), the activation and/or deactivation of downlink TCI states (e.g., downlink TCI state switching), the activation and/or deactivation of spatial relations (e.g., spatial relation switching), and/or the maintenance of uplink time alignment (e.g., timing advance adjustments).

Generally, each UE receiving a MAC-CE indicating performance of one or more actions by the receiving UE independently determines an application time for performing such action(s). An application time refers to a time when the one or more actions indicated in the MAC-CE are to be performed by the UE receiving the MA-CE. More specifically, the application time may be used by a UE receiving the MAC-CE to determine when an activation, a deactivation, an update, etc. triggered by the MAC-CE is to be performed, applied, and/or carried out by the UE.

Conventional methods for determining application times of MAC-CE-based actions involve calculating application times relative to hybrid automatic repeat request (HARQ) transmissions, and more specifically, HARQ acknowledgement (ACK) transmissions indicating successful receipt of MAC-CEs. For example, a UE receiving a MAC-CE indicating that the UE is to perform a TCI state activation may determine an application time for performing the activation as a specification-defined (e.g., 3GPP-defined) offset from when a HARQ ACK is transmitted in response to successfully receiving the MAC-CE (e.g., Application Time=Timing of HARQ ACK+Static Offset). In other words, conventionally the application time is determined relative to the HARQ ACK transmission. Determining application times for MAC-CE-based actions relative to HARQ ACK transmission timing presents a technical problem in cases where the MAC-CE is transmitted to multiple UEs that may receive the MAC-CE at different times, respond with a HARQ ACKs at different times, and therefore take the MAC-CE indicated actions at different times. Moreover, a number of HARQ transmissions utilized for each UE in a group of UEs receiving one or more MAC-CEs triggering the performance of coordinated actions may be different based on, for example, channel conditions and/or an ability of each UE in the group to decode the transmitted MAC-CEs. Further, HARQ transmissions for each UE may not be aligned in time. As such, a timing of a HARQ ACK message transmitted by one UE in response to receiving a MAC-CE may be different than a timing of a HARQ ACK message transmitted by another UE in response to the MAC-CE, thereby resulting in different application times calculated for the different UEs for performing the same MAC-CE-based action (e.g., intended to be performed synchronously).

Different application times may result in activations, deactivations, and/or updates triggered by the MAC-CE being misaligned across UEs and/or the transmitter of the MAC-CE. This misalignment can cause various technical problems, such as sub-optimal beamforming for communication, reduced communication reliability, and/or increased inter-network interference (e.g., due to frames and/or slots not being synchronized), to name a few.

Certain aspects of the present disclosure provide a technical solution to the aforementioned technical problems by enabling each recipient UE of a MAC-CE to determine MAC-CE-based application times in a manner that allows alignment of application times regardless of HARQ-based transmission timing. In some aspects, application times are absolute, rather than relative, which allows for application time alignment under varying MAC-CE receipt and HARQ ACK scenarios. Beneficially, an absolute application time may be configured to allow for a maximum number of HARQ transmissions to be performed among a group of UEs receiving the same or coordinated MAC-CEs so that application times are aligned regardless of individual UE HARQ timing. In some aspects, the absolute application time may be indicated in a MAC-CE such that any recipient UE is able to determine the absolute application time directly. Notably, determining MAC-CE-based application times based on absolute application times is beneficially low in complexity and easy to implement within existing systems. Accordingly, the absolute application time overcomes the technical problems discussed above with respect to relative timings based on each individual UE's HARQ ACK timing.

Other aspects of the present disclosure provide a technical solution to the aforementioned technical problems by enabling each UE receiving a MAC-CE to determine an application time based on a number of HARQ messages transmitted in response to the MAC-CE. For example, a UE receiving a MAC-CE triggering the UE to perform an action may determine an application time for performing the action based on a dynamic offset from a time when a HARQ ACK message is transmitted (e.g., to a transmitter of the MAC-CE) in response to the MAC-CE. In some aspects, the offset used by the UE in determining the application time is determined by the UE based on one or more of: a maximum application time associated with the UE; a number of HARQ transmissions scheduled for use by the UE in response to the MAC-CE; and a transmission interval measured between each HARQ transmission scheduled for use by the UE in response to the MAC-CE (e.g., where the transmission interval measured between each HARQ transmission is the same). The maximum application time associated with the UE corresponds to a period of time measured from an initial HARQ transmission and a last HARQ transmission that are scheduled for use by the UE for the MAC-CE, which may be adjusted to align with maximum application times associated with one or more other UEs also receiving the MAC-CE. Accordingly, in some cases, the maximum application time may be configured based, at least in part, on one or more of: a number of HARQ transmissions scheduled for use by other recipient UEs in response to the MAC-CE; a transmission interval measured between each HARQ transmission scheduled for use by the other recipient UEs in response to the MAC-CE; and/or scheduling delay(s) between an initial HARQ transmission scheduled for the UE and initial HARQ transmission(s) scheduled for one or more of the other recipient UEs. Because timing for performing a MAC-CE based action is dynamically determined based on a number of HARQ messages transmitted in response to the MAC-CE, as well as other factors described above in some cases, application times determined by each recipient UE may be aligned. Notably, this dynamic offset approach is efficient with respect to the payload size of a MAC-CE because it does not require sending any explicit indication of an application time to enable application time alignment. Thus, network overhead and power usage are saved. Accordingly, the dynamic offset approach that enables application time alignment likewise overcomes the technical problems discussed above with respect to relative timings based on each individual UE's HARQ ACK timing.

Notably, the improved approaches for determining application times for MAC-CE-based actions described herein have the beneficial technical effect of aligning application times across multiple UEs, and thereby improving overall reliability and efficiency of wireless communications.

The alignment of application times across multiple UEs may be especially important in certain UE contexts, such as in industrial internet of things (IoT) systems. An industrial IoT is an ecosystem of devices, sensors, applications, and/or associated networking equipment (e.g., a system of UEs and network entities) that work together to collect, monitor, and/or analyze data from industrial operations. Tight control of devices (e.g., UEs) in this type of system may be crucial to overall performance of the system. For example, IoT may be used to improve and enhance the existing features of control valves to increase performance and reduce maintenance cost in a valve control system used, for example, to control the flow of fluid within a process. Accordingly, it may be critical that each valve performs activation and/or deactivation at a same time. Thus, where MAC layer signaling is used to trigger activation and/or deactivation at each valve in the system, application times for performing such actions need to be aligned across the different valves.

Introduction to Wireless Communications Networks

The techniques and methods described herein may be used for various wireless communications networks. While aspects may be described herein using terminology commonly associated with different generation wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network entities). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Generally, a cell may refer to a portion, partition, or segment of wireless communication coverage served by a network entity within a wireless communication network. A cell may have geographic characteristics, such as a geographic coverage area, as well as radio frequency characteristics, such as time and/or frequency resources dedicated to the cell. For example, a specific geographic coverage area may be covered by multiple cells employing different frequency resources (e.g., bandwidth parts) and/or different time resources. As another example, a specific geographic coverage area may be covered by a single cell.

Figure 2:
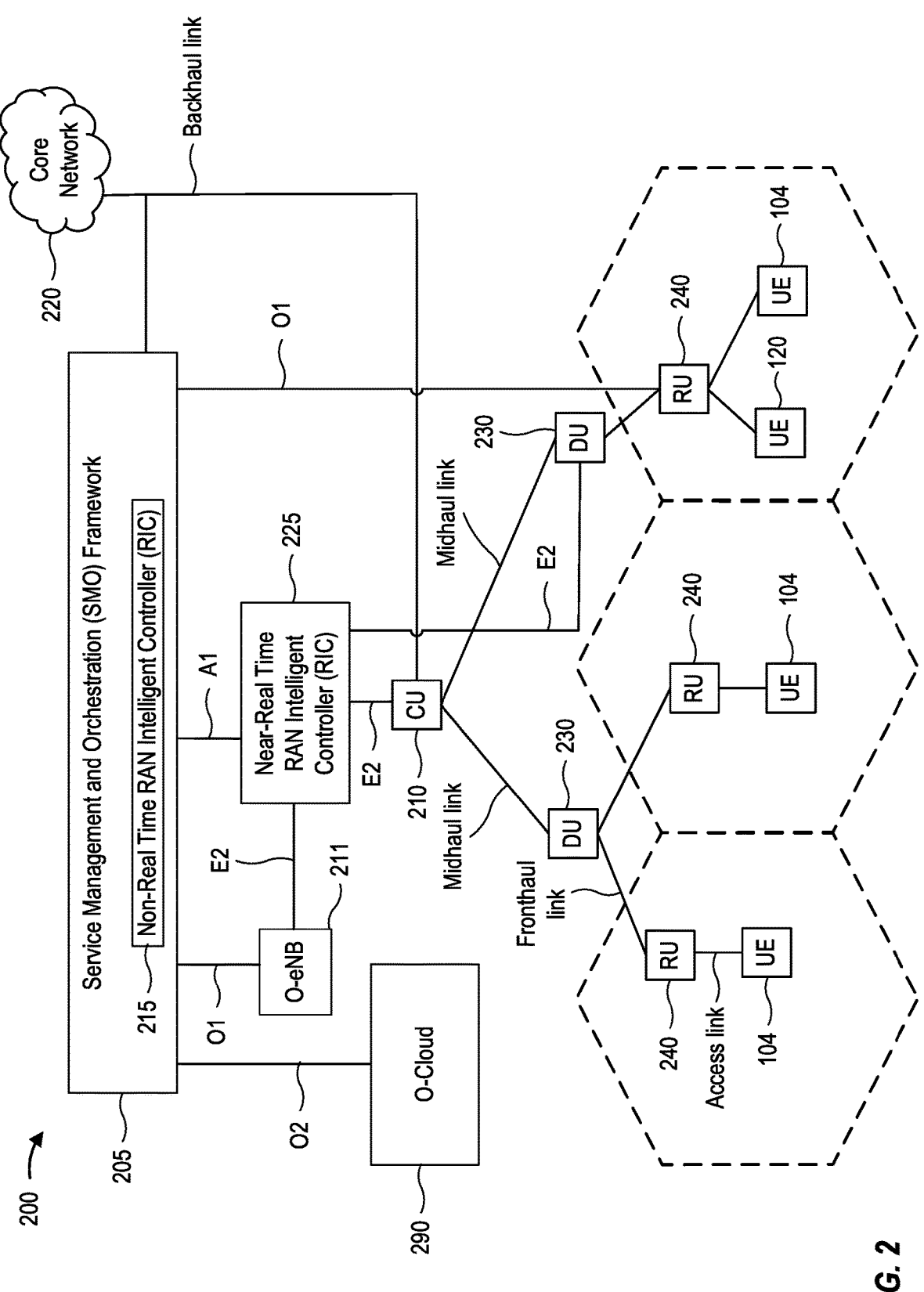
FIG. 2 depicts an example disaggregated base station (BS) architecture.

While BSs 102 are depicted in various aspects as unitary communications devices, BSs 102 may be implemented in various configurations. For example, one or more components of a BS may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a BS may be virtualized. More generally, a BS (e.g., BS 102) may include components that are located at a single physical location or components located at various physical locations. In examples in which a BS includes components that are located at various physical locations, the various components may each perform functions such that, collectively, the various components achieve functionality that is similar to a BS that is located at a single physical location. In some aspects, a BS including components that are located at various physical locations may be referred to as a disaggregated radio access network architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A BS configured to communicate using mmWave/near mmWave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 architecture. The disaggregated BS 200 architecture may include one or more central units (CUs) 210 that can communicate directly with a core network 220 via a backhaul link, or indirectly with the core network 220 through one or more disaggregated BS units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
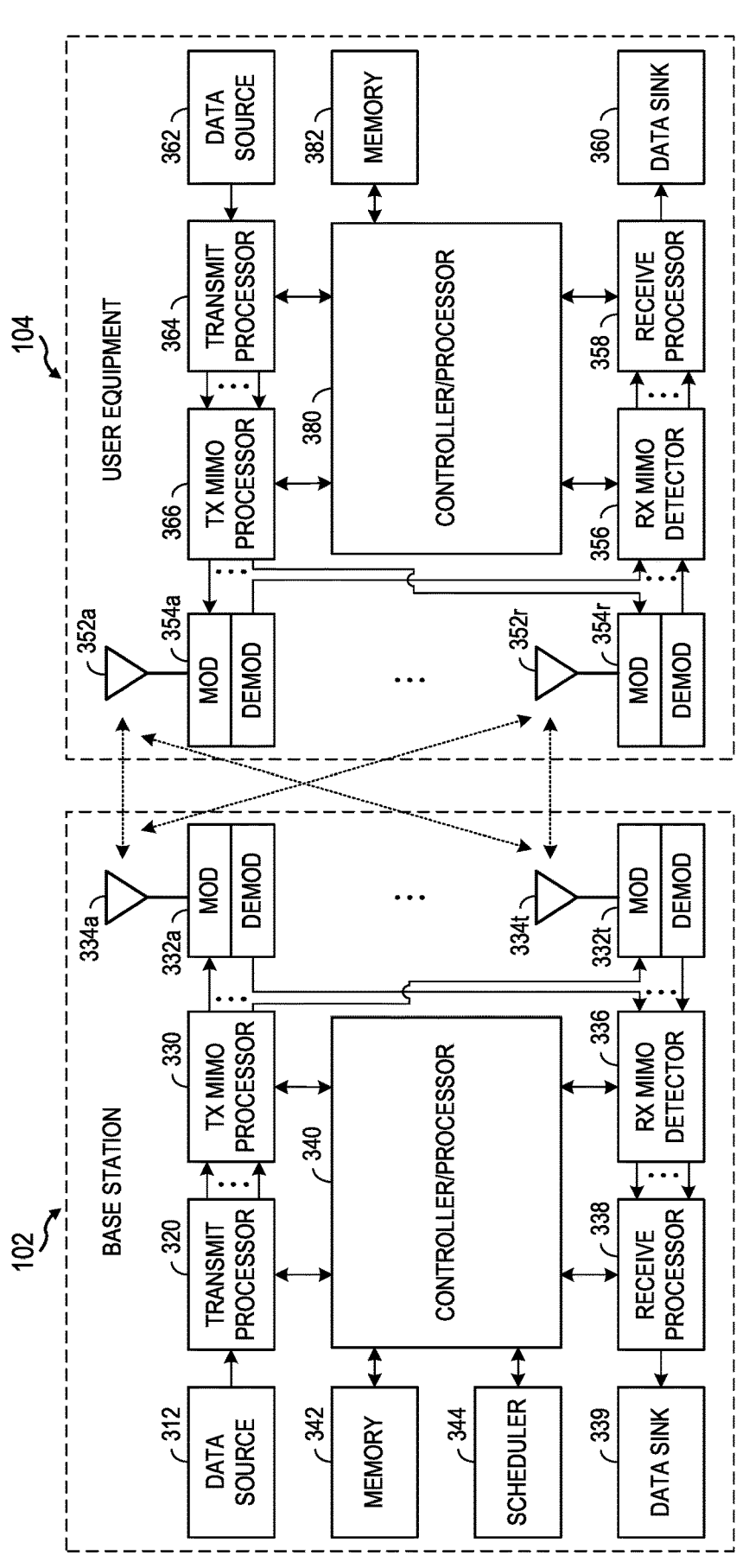
FIG. 3 depicts aspects of an example network entity, such as an example BS, and an example user equipment (UE).

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a RX MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
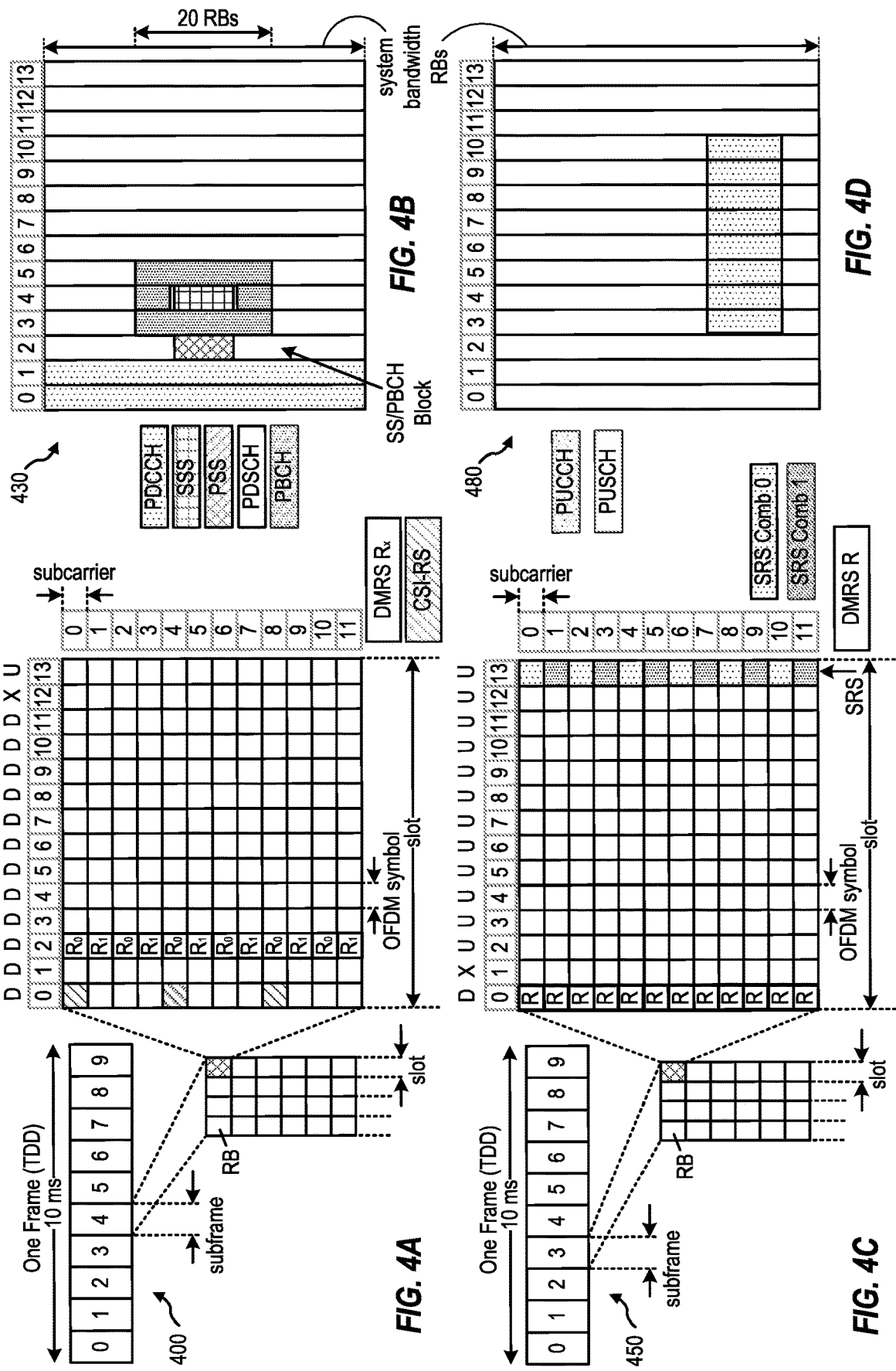
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^μ×15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Application Time of MAC-CE-Based Actions

A MAC-CE is a special type of MAC layer structure used to carry control information. MAC-CEs may be communicated between UEs and network entities to allow for signaling communication exchange between these entities. MAC-CEs may be used to carry out various procedures at the MAC layer including, but not limited to, the activation and/or deactivation of secondary cells (SCells), the activation and/or deactivation of uplink transmission configuration indication (TCI) states (e.g., uplink TCI state switching), the activation and/or deactivation of downlink TCI states (e.g., downlink TCI state switching), the activation and/or deactivation of spatial relations (e.g., spatial relation switching), and/or the maintenance of uplink time alignment. In particular, a MAC-CE is used to provide an indication to perform one or more actions for the respective procedure. For example, for the maintenance of uplink time alignment, the MAC-CE may include an indication of a timing advance value adjustment to be applied after a random access channel (RACH) procedure. As another example, the MAC-CE used for SCell activation/deactivation may include an indication to deactivate a first SCell and activate a second SCell configured for a UE. Further, as another example, for a TCI state activation procedure, the MAC-CE may indicate a list of TCI states that are to be activated at a UE.

An application time of such MAC-CE-based action(s) refers to a time when the one or more actions indicated in the MAC-CE are to be performed by a receiver of the MAC-CE, such as a recipient UE. More specifically, the application time may be used by a receiver of the MAC-CE to determine when an activation, a deactivation, an update, etc. triggered by the MAC-CE is to be performed, applied, and/or carried out by the receiver.

The 3GPP specification (e.g., 3GPP Technical Specification (TS) 38.133) defines the application times for MAC-CE-based actions relative to hybrid automatic repeat request (HARQ) acknowledgement (ACK) transmissions. Specifically, HARQ is a scheme within the MAC layer used to enhance the efficiency and reliability of data transmissions between a transmitter and a receiver of data (e.g., between a network entity and a UE, such as BS 102 of FIGS. 1 and 3 and UE 104 of FIGS. 1-3). The HARQ transmission and reception process, when implemented, involves transmitting data, receiving HARQ ACK or negative acknowledgement (NACK) (e.g., in case of an erroneously received packet, an inability to receive a packet, etc.), and performing re-transmissions of the data, when necessary. In cases where a MAC-CE is communicated between a network entity and a UE and HARQ is implemented, the UE transmits HARQ NACK (simply referred to herein as "NACK") to request a re-transmission of the MAC-CE and, alternatively, HARQ ACK (simply referred to herein as "ACK") when the MAC-CE is successfully received and decoded by the UE.

Accordingly, per the 3GPP specification, an application time for a MAC-CE-based action is generally based on when an ACK is transmitted/received in response to its respective MAC-CE. The 3GPP specification indicates that an application time for a MAC-CE is a static offset from the transmission of an ACK for the MAC-CE, such that performance of the action(s) triggered via the MAC-CE is delayed a period of time equal to the specification-defined offset from when the ACK was transmitted/received (e.g., Application Time=(Time of ACK transmission/reception)+(Specification-Defined Offset)). For example, in 3GPP TS 38.133, v18.2.0, section 8.10.3.0, a MAC-CE-based TCI state switch delay is specified as $$3N_{slot}^{subframe,\mu}$$

(where N is the number of slots in one subframe with numerology $\mu$, and numerology $\mu$=0, 1, 2, 3 corresponds to subcarrier spacing (SCS) of 15 KHz, 20 KHz, 60 KHz, and 120 KHz, respectively) such that a UE receiving a MAC-CE activation command to switch TCI states active at the UE, in slot n is expected to receive physical downlink control channel (PDDCH) with an old TCI state until $$\left(\text{slot } n + T_{HARQ} + 3N_{slot}^{subframe,\mu}\right),$$

and after the new activated TCI states, where $T_{HARQ}$ is the timing between downlink transmission/reception of the MAC-CE and uplink transmission/reception of the ACK in response to the MAC-CE.

Figure 5:
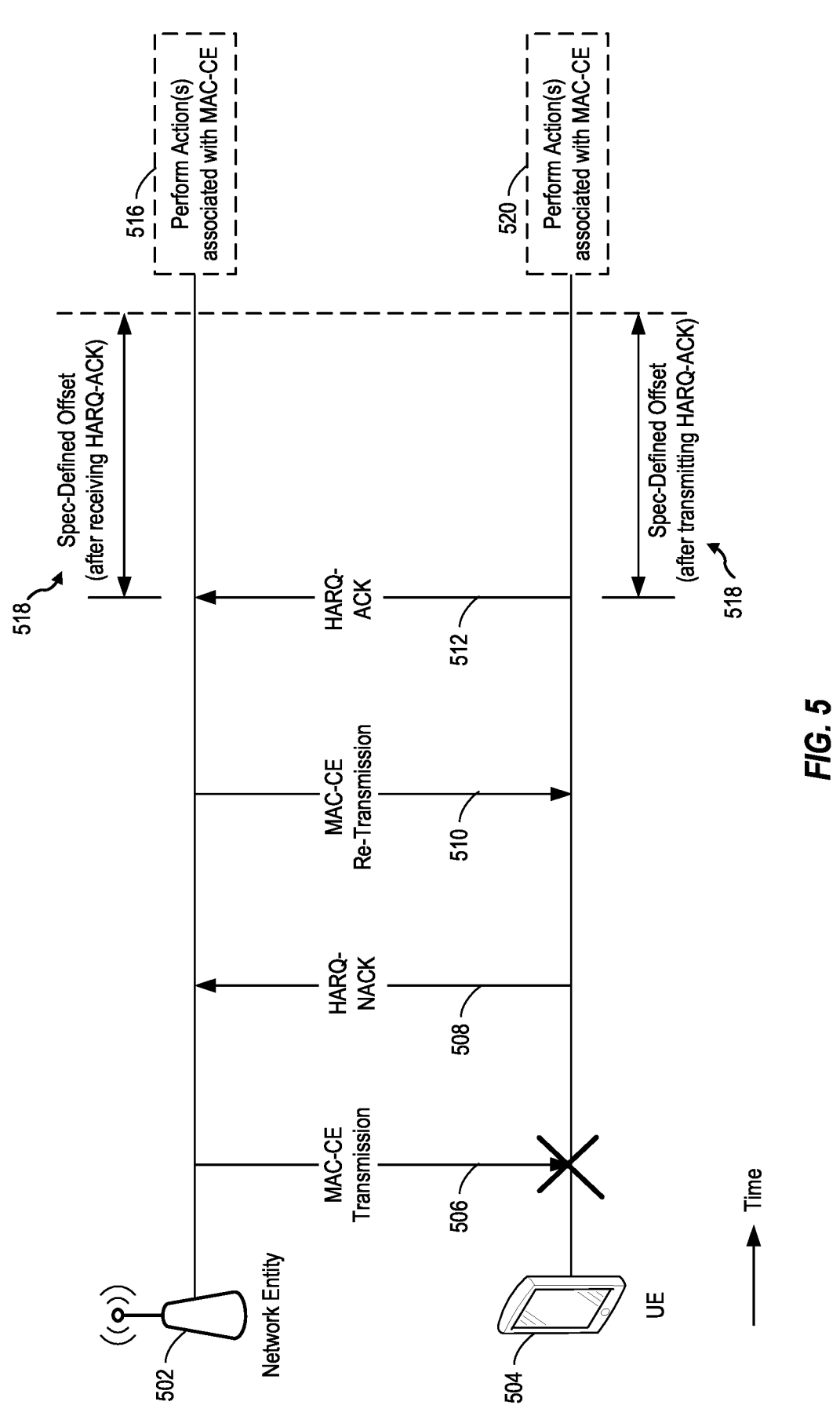
FIG. 5 illustrates example application time of MAC-CE-based action(s) relative to hybrid automatic repeat request (HARQ) acknowledgement (ACK) transmission, according to the Third Generation Partnership Project (3GPP) specification.

FIG. 5 illustrates example application time of MAC-CE-based action(s) relative to HARQ ACK transmission, according to the 3GPP specification. As illustrated in FIG. 5, a network entity 502 (e.g., such as BS 102 of FIGS. 1 and 3, or a disaggregated base station as discussed with respect to FIG. 2) transmits a MAC-CE 506 to UE 504 (e.g. such as UE 104 of FIGS. 1-3). MAC-CE 506 indicates one or more actions that are to be performed by UE 504, for example, MAC-CE 506 indicates that UE 504 is to deactivate a first SCell and activate a second SCell configured for IE 504. Due to poor channel conditions and/or an inability of UE 504 to successfully receive and decode MAC-CE 506, reception of MAC-CE 506 is un successful. Accordingly, UE 504 transmits a HARQ-NACK message 508 to network entity 502.

In some cases, prior to network entity 502 transmitting MAC-CE 506 to UE 504, network entity 502 transmits, to UE 504, a timing advance (TA) command. The TA command may request that UE 504 adjust its uplink transmission timing when sending HARQ-ACK and/or HARQ-NACK messages to network entity 502 (e.g., to account for propagation delay between UE 504 and network entity 502). Accordingly, based on receiving the TA command, UE 504 may advance the timing for transmitting HARQ-NACK message 508 to UE 504. In other words, UE 504's uplink transmission time of HARQ-NACK message 508 is advanced according to the TA command such that the time of receiving HARQ-NACK message 508 at network entity 502 aligns with the transmission time (without the TA applied) of HARQ-NACK message 508 by UE 504.

In response to receiving HARQ-NACK message 508, network entity 502 retransmits the MAC-CE as MAC-CE re-transmission 510. MAC-CE retransmission 510 is successfully received and decoded by UE 504; thus, UE 504 transmits HARQ-ACK message 512 to inform network entity 502 of the successful MAC-CE transmission and reception. As described above, the transmission of HARQ-ACK message 512 may be advanced according to the TA command, such that the transmission time of HARQ-ACK message 512 (e.g., known by UE 504) aligns with the receiving time of HARQ-ACK message 512 at network entity 502 (e.g., known by network entity 502).

As described above, in this example, the MAC-CE includes a command to deactivate a first SCell and activate a second SCell configured for UE 504. Per the 3G PP specification. UE 504 waits to perform this activation/deactivation until a time period (e.g., specification-defined offset 518) after the transmission time of HARQ-ACK message 512 has passed/occurred. Similarly, network entity 502 waits to perform this activation/deactivation until a time period (e.g., the same specification-defined offset 518) after the reception time of HARQ-ACK message 512 has passed/occurred.

For example, UE 504 may transmit and network entity 502 receives HARQ-ACK message 512 at t=0 and specification defined-offset 518 is equal to 4 milliseconds (ms), then UE 504 and network entity wait until t=4 to perform the SCell activation/deactivation indicated by the MAC-CE. As such, application time for the SCell activation/deactivation is synchronized between UE 504 and network entity 502.

As above, these existing techniques for determining application times for MAC-CE-based actions relative to the timing of HARQ-ACK transmissions present a technical problem in cases where the MAC-CE is transmitted to multiple receivers (e.g., multiple UEs) with the intent that the application times for the MAC-CE indicated actions be aligned among the receivers. In particular, application times determined by each of the receivers of the MAC-CE may be different where the application times are based on a timing of a HARQ-ACK message transmitted by each of the receivers in response to the MAC-CE. As above, this may be because of difference in signal propagation time to different receivers, different reception and decoding success rates among the different receivers, etc. Accordingly, conventional techniques may result in the misalignment of actions across receivers, which may sub-optimal beamforming performance, sub-optimal transmit power control, reduced communication reliability, and/or increased inter-network interference, to name a few.

Figure 6:
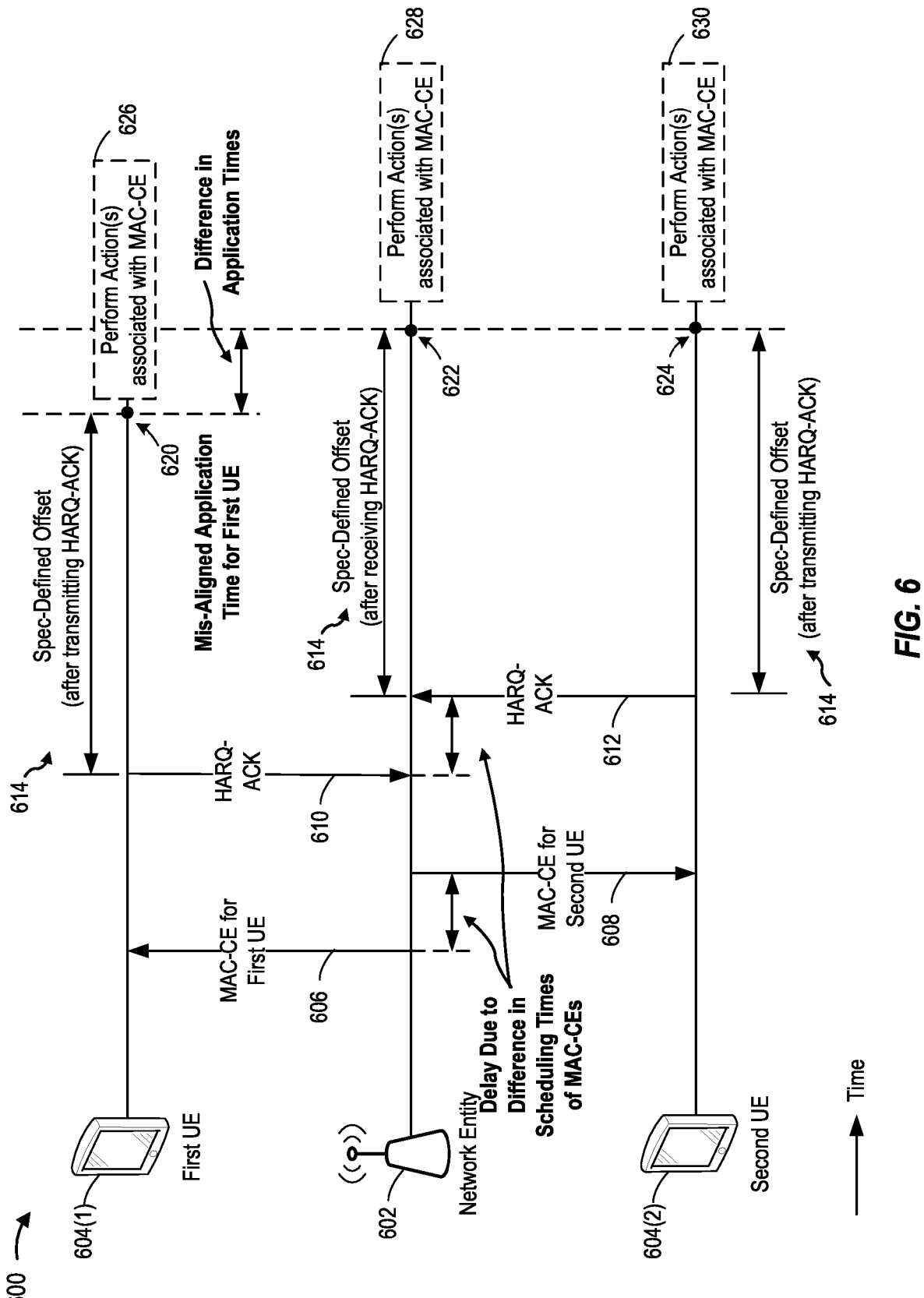
FIG. 6 illustrates an example of misaligned application times for MAC-CE-based actions across multiple UEs.

FIG. 6 illustrates an example scenario 600 of misaligned application times for MAC-CE-based actions across multiple UEs. In example scenario 600, a first UE 604(1) and a second UE 604(2) are intended recipients of a MAC-CE from network entity 602. The MAC-CE intended for first UE 604(1) and second UE 6042) may trigger each of first UE 604(1) and second UE 604(2) to perform one or more actions (e.g., an activation, a deactivation, an update, etc.). An application time for performing such action(s) determined by first UE 604(1) may be different than an application time for performing such action(s) determined by second UE 604(2) due to differences in MAC-CE scheduling times for the UEs.

As illustrated, network entity 602 transmits MAC-CE 606, towards first UE 604(1), and MAC-CE 608 towards second UE 604(2). MAC-CE 606 and MAC-CE 608 may both indicate similar actions that are to be performed by first UE 604(1) and second UE 604(2), such as, performing a TCI state switch to a same TC state. MAC-CE 606 may be transmitted via unicast signaling to first UE 604(1) or multicast signaling to first UE 604(1) and one or more other UEs. Similarly, MAC-CE 608 may be transmitted via unicast signaling to second UE 604(2) or multicast signaling to second UE 604(2) and one or more other UEs.

In this example, the times scheduled for transmitting MAC-CE 606 and MAC-CE 608, to first UE 604(1) and second UE 604(2) are different. For example, MAC-CE 606 may be transmitted by network entity 602 in a first symbol and MAC-CE 608 may be transmitted by network entity 602 in a second symbol later in time than the first symbol. In other words, the transmission of MAC-CE 608 is delayed by a period of time after transmitting MAC-CE 606.

Due to such differences in scheduling times of MAC-CE 606 and MAC-CE 608 and thus, the delay between their transmissions and corresponding HARQ transmission(s)), application times (e.g. for performing action(s) indicated in the MAC-CE) determined by first UE 604(1) and second TIE 604(2) may not align, even in cases where a number of HARQ messages transmitted by each UE is the same.

For example, as illustrated, first UE 604(1) successfully receives and decodes MAC-CE 606 from network entity 602, and transmits HARQ ACK message 610. In other words, no re-transmissions of MAC-CE 606 are necessary; thus, only one HARQ transmission is transmitted by first UE 604(1). Similarly, second UE 604(2) successfully receives and decodes MAC-CE 608 from network entity 602, and transmits HARQ ACK message 612. In other words, re-transmission of MAC-CE 608 is also not necessary, and only one HARQ transmission is transmitted by second UE 604 (2). Although each of UE 604(1) and 604(2) transmits only a single HARQ transmission, HARQ-ACK message 610 is transmitted by first UE 604(1) and thereafter received by network entity 602 earlier in time than HARQ-ACK message 612 transmitted by second UE 604(2) and thereafter received by network entity 602. Accordingly, because a timing of the HARQ-ACK messages are different, the application times determined by first UE 604(1), second UE 604(2), and network entity 602 are also different. In particular, specification-defined offsets 614 used by each of first UE 604(1), second UE 604(2), and network entity 602 are the same, but the HARQ ACK transmission timings are different, thereby causing the application times for performing actions indicated in MAC-CE 606 and MAC-CE 608 to be different (e.g., Application Time=(Time of ACK transmission)+(Specification-Defined Offset)). The application time determined by first UE 604(1) is earlier in tie than the application time determined by second UE 604(2) and network entity 602. As such, first UE 604(1) may perform the TCI state switch prior in time than the TCI switch performed by network entity 602 and second UE 604(2). This may result in a possible beam mismatch when first UE 604(1) is communicating with network entity 602 during the time period between the application time determined by first UE 604(1) and the application time determined by second UE 604(2) and network entity 602 (e.g., due to different activated TCI states at the different entities). Beam mismatch may adversely affect the efficiency and/or reliability of wireless communication in the wireless communications system.

Figure 7:
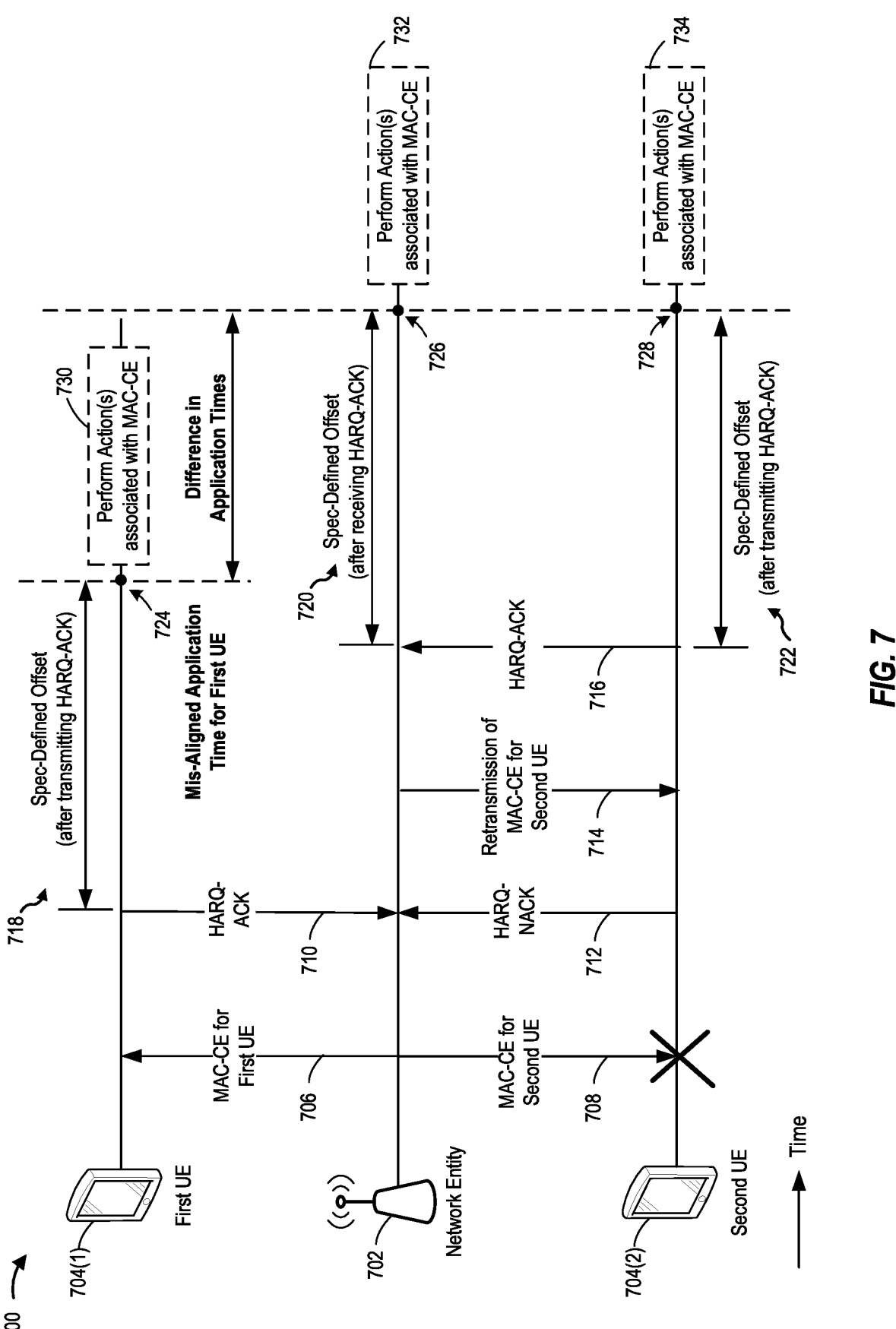
FIG. 7 illustrates another example of misaligned application times for MAC-CE-based actions across multiple UE's.

FIG. 7 illustrates another example 700 of misaligned application times for MAC-CE-based actions across multiple UEs. Similar to example 600, in example 700, a network entity 702 transmits MAC-CE 706 towards a first UE 704(1), and MAC-CE 708 towards second UE 704(2).

However, different from example 600, in example 700, MAC-CE 706 and MAC-CE 708 are scheduled to be transmitted at a same time, but only first UE 704(1) receives and decode MAC-CE 706 on the first try. As such, first UE 704(1) transmits a HARQ ACK message 710 after receiving MACI-CE 706. Second U 704(2;), on the other hand, fails to decode MAC-CE 708 on the first try and transmits a HARQ-NACK message 712 to trigger re-transmission of MAC-CE 708 (e.g., as MAC-C 714) by network entity 702. Second UE 704(2) then successfully receives and decodes MAC-CE 714 (e.g., a re-transmission of MAC-CE 708) and accordingly transmits a HARQ-ACK message 716 in response. Because only one. HARQ message (e.g., HARQ ACK message 710) is transmitted by first UE 704(1) and two HARQ messages (e.g., HARQ NACK message 712 and HARQ ACK message 716) are transmitted by second UE 704(2), the application times determined by first UE 704(1), second UE 704(2), and network entity 702 are different. Specifically, because only one HARQ message is transmitted by first UE 704(1), the HARQ-ACK message 710 is transmitted earlier in time than the HARQ-ACK message 716 transmitted by second UE 704(2). Misalignment in the timing of each HARQ-ACK message results in different application times, given the application times are determined relative to a HARQ ACK message timing (e.g., even when the specification-defined offset 722 used to calculate the application times are the same).

Thus, as illustrated by example 600 and example 700 in FIGS. 6 and 7, respectively, determining application times for MAC-CE-based actions relative to HARQ ACK transmission using a statically defined timing offset creates a technical problem for aligning MAC-CE indicated actions across multiple UEs.

Misalignment of application times across UEs may be especially problematic in IoT systems, given the tight control of devices (e.g., UEs) in this type of system is crucial to overall performance of the system. The aforementioned technical problems, including decreased reliability and/or efficiency of communication, result when using conventional methods to determine application times for MAC-CE-based actions in multi-UE scenarios; thus, improved techniques are desired.

Example Aspects Related to Determining an Application Time for a MAC-CE-Based Action Based on an Absolute Application Time In some aspects, in order to overcome technical problems associated with the alignment of application times for MAC-CE-based actions in multi-UE scenarios, such as those described above with respect to FIGS. 6 and 7, aspects described herein provide for determining application times for MAC-CE-based actions, instead, based on absolute application times. For example, an absolute application time may be an application time (e.g., such as a definite symbol, subframe, frame, slot, etc.) for performing an activation, deactivation, update, etc. triggered by a MAC-CE (e.g., time that is not relative to any external factors).

The absolute application time may be configured by a network entity (e.g., such as BS 102 of FIGS. 1 and 3, or a disaggregated base station as discussed with respect to FIG. 2) and provided to each intended recipient (e.g., a UE, such as UE 104 of FIGS. 1-3) of a MAC-CE (e.g., thereby triggering one or more of the same actions) in the MAC-CE directed for the respective recipient. This is different than conventional MAC-CEs used to trigger similar action(s), given conventional MAC-CEs do not include an indication of the absolute application time for performing the MAC-CE-based action(s). Each UE receiving the MAC-CE may perform the action(s) triggered by the MAC-CE at the indicated absolute application time included in the MAC-CE. Accordingly, alignment of actions performed by the multiple UEs may be achieved (e.g., where multiple UEs are triggered to perform an activation, a deactivation, an update, etc., each UE may perform the action at the same absolute application time). Additionally, the network entity that transmits the MAC-CE with the indication to perform such action(s) may also perform the MAC-CE-based action(s) at the absolute application time. Thus, alignment may not only be achieved between the multiple UEs, but also between the network entity and the multiple UEs. Alignment of action(s) across multiple UEs may improve overall reliability and efficiency of wireless communications.

The indication of the absolute application time included in a MAC-CE may be provided as an index associated with a frame, an index associated with a slot, an index associated with a symbol, etc. in a wireless communications frame structure. Further indication of the absolute application time included in a MAC-CE may be provided as a bit map index, a numerical value known to indicate a number of time units (e.g., number of slots), etc.

Although embodiments here describe performing MAC-CE-based actions at the absolute application time, in certain other embodiments, the MAC-CE-based actions may be performed during a time period including the absolute application time, a period of time after the absolute application, and/or the like.

Beneficially, the configured absolute application time allows for a maximum number of HARQ transmissions enabled for one or more UEs to be performed in response to the MAC-CE, should the maximum number of HARQ transmissions be necessary for one or more of the UEs (e.g., "worst case" scenarios). As such, actions performed based on the absolute application time may be performed at a time irrespective of when HARQ ACK messages are transmitted for MAC-CEs triggering such actions.

For example, two UEs may receive a MAC-CE with a command to perform TCI state switching. A first UE of the two UEs may be configured to transmit up to four HARQ transmissions in response to the MAC-CE, and a second UE of the two UEs may be configured to transmit up to five HARQ transmissions in response to the MAC-CE. In a "worst case" scenario, the first UE may use all four of its configured HARQ transmissions to request re-transmissions of the MAC-CE (e.g., where the last HARQ transmission is used to provide an ACK for the MAC-CE). Similarly, in a "worst case" scenario for the second UE, the second UE may use all five of its configured HARQ transmission to request re-transmissions of the MAC-CE (e.g., where the last HARQ transmission is used to provide an ACK for the MAC-CE). As such, to account for each "worst case" scenario associated with the first UE and the second UE, respectively, an absolute application time for the MAC-CE-based action needs to occur at a point in time (e.g., a frame, a slot, a symbol, a second, a millisecond (ms), etc.), later in time than when the last HARQ transmission configured for the first UE is expected to occur and when the last HARQ transmission configured for the second UE is expected to occur.

Figure 8A:
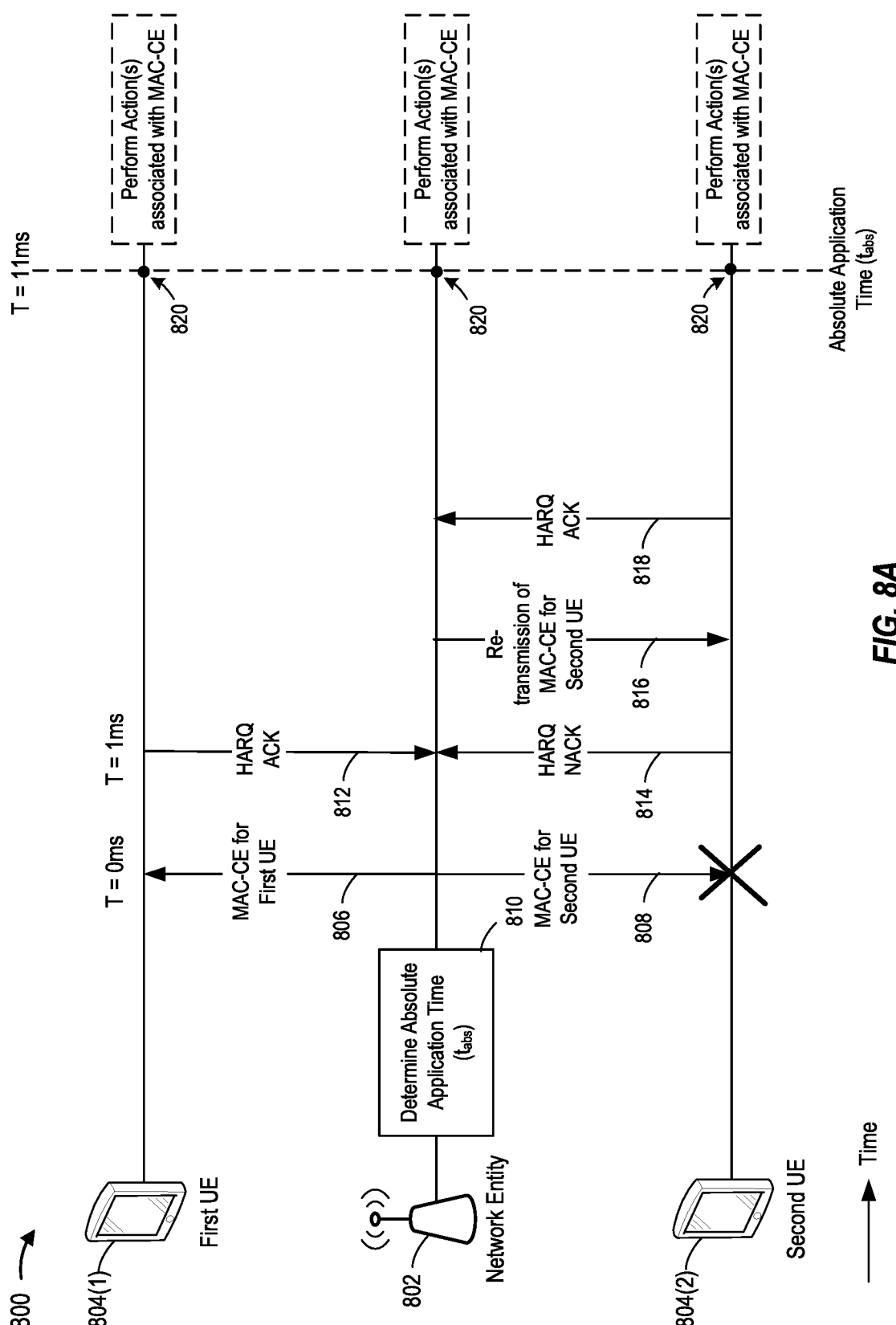
FIG. 8A depicts an example scenario where application times for MAC-CE-based actions are based on an absolute application time.
Figure 8B:
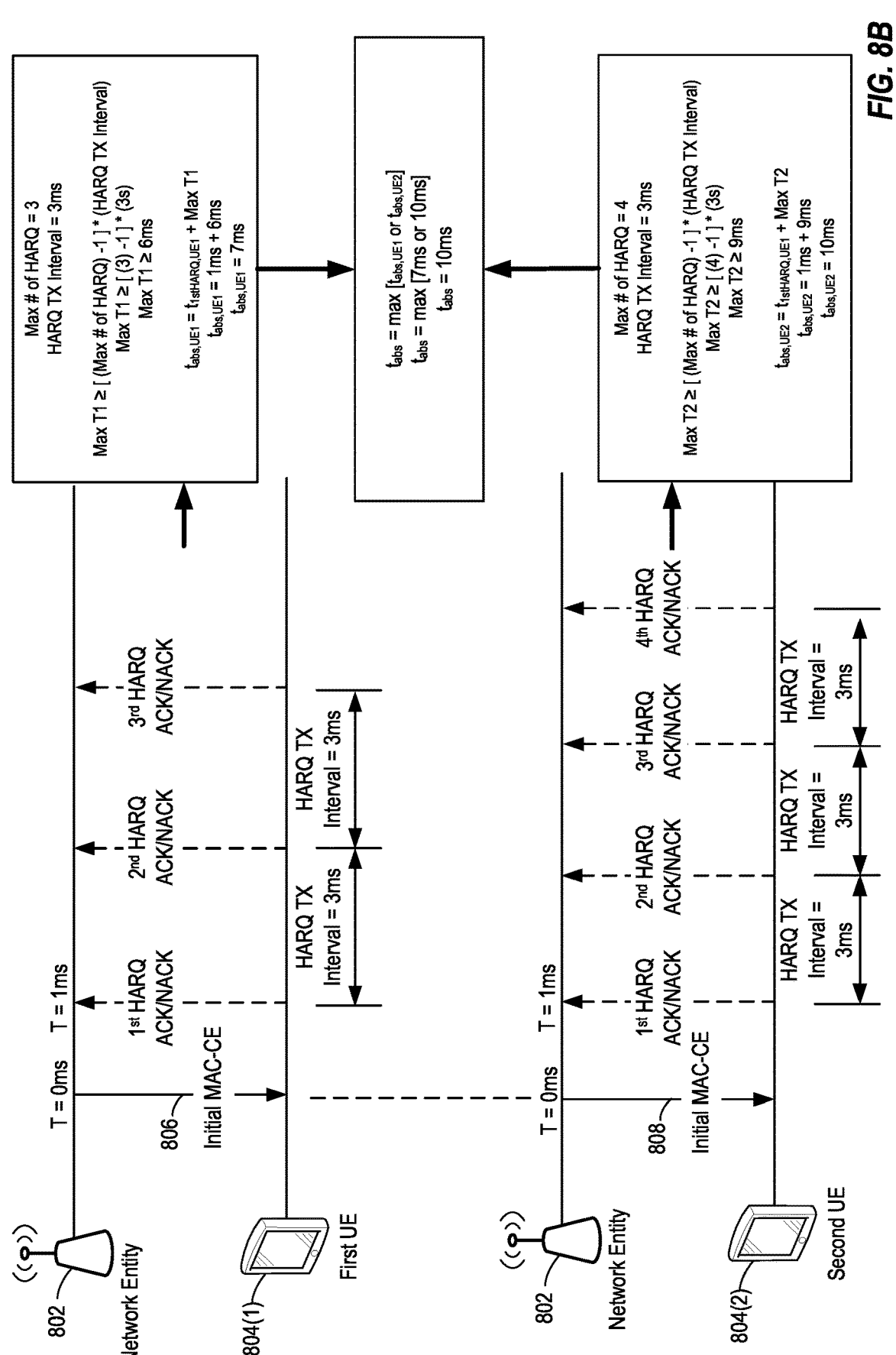
FIG. 8B depicts an example determination of the absolute application time used in FIG. 8A.

FIG. 8A depicts an example scenario 800 where application times for MAC-CE-based actions (e.g., for multiple UEs) are based on an absolute application time. FIG. 8B depicts an example determination of the absolute application time used in FIG. 8A. Accordingly, FIGS. 8A-8B are described in conjunction below.

In scenario 800, a first UE 804(1) and a second UE 804(2) are intended recipients of a MAC-CE from a network entity 802. The MAC-CE intended for first UE 804(1) and second UE 804(2) may trigger each of first UE 804(1) and second UE 804(2) to perform one or more actions. Application times for performing such action(s) may be the same for both first UE 804(1) and second UE 804(2) where the application times are based on an absolute application ire (a; configured by network entity 802.

In particular, prior to transmitting a MAC-CE 806 to first UE 804(1) and a MAC-CE 808 to second UE 804(2), network entity 802 determines, at 810, an absolute application time ($t_{abs}$) for performance of the actions triggered via MAC-CE 806 and MAC-CE 808.

As illustrated in FIG. 8B, the absolute application time may be determined by network entity 802 based on, for example, one or more of: (1) a maximum number of HARQ transmissions configured (e.g., that may be scheduled) for use by first UE 804(1) in response to MAC-CE 806; (2) a transmission interval measured between each HARQ transmission configured for use by first UE 804(1) in response to MAC-CE 806; (3) a timing of a first HARQ transmission scheduled for use by first UE 804(1) in response to MAC-CE 806; (4) a maximum number of HARQ transmissions configured (e.g., that may be scheduled) for use by second UE 804(2) in response to MAC-CE 808; (5) a transmission interval measured between each HARQ transmission configured for use by second UE 804(2) in response to MAC-CE 808; and/or (6) a timing of a first HARQ transmission scheduled for use by second UE 804(2) in response to MAC-CE 808.

For example, the maximum number of HARQ transmissions configured for use by first UE 804(1) in response to MAC-CE 806 is equal to three (e.g., shown as $1^{st}$ HARQ ACK/NACK, $2^{nd}$ HARQ ACK/NACK, and $3^{rd}$ HARQ ACK/NACK), and the transmission interval measured (e.g., HARQ transmission interval) measured between each of the three configured HARQ transmissions is equal to 3 ms. As such, a maximum application time for first UE 804(1) (e.g., Max T1), to allow for a "worst case" scenario where all three HARQ transmissions are, indeed, used by first UE 804(1) in response to MAC-CE 806, may be greater than or equal to 6 ms (e.g., measured from the transmission of $1^{st}$ HARQ ACK/NACK for first UE 804(1)). In particular, network entity 802 (e.g., in FIG. 8A) may calculate this maximum application time for first UE 804(1) as:

$$\text{Max}T1 \ge [(\text{Max number of } HARQ \text{ transmissions}) - 1] *$$
$$(HARQ \text{ transmission interval})$$
$$\text{Max}T1 \ge [3 \, HARQ \text{ transmissions} - 1] * 3 \text{ ms interval}$$
$$\text{Max}T1 \ge 6 \text{ ms.}$$

The maximum application time for first UE 804(1) (e.g., Max T1) is measured from the scheduled time for the transmission of $1^{st}$ HARQ ACK/NACK for first UE 804(1) ($t_{1stHARQ,UE1}$=1 ms); thus, network entity 802 determines the absolute application time for first UE 804(1) ($t_{abs,UE1}$) as greater than or equal to the sum of the timing of the $1^{st}$ HARQ ACK/NACK scheduled for first UE 804(1) ($t_{1stHARQ,UE1}$) and Max T1 (e.g., $t_{abs,UE1} \ge t_{1stHARQ,UE1}$+Max T1)). Accordingly, the absolute application time for first UE

804(1) ($t_{abs,UE1}$) determined by network entity 802 is greater than or equal to 7 ms (e.g., 1 ms+6 ms).

Additionally, the maximum number of HARQ transmissions configured for use by second UE 804(2) in response to MAC-CE 808 is equal to four (e.g., shown as $1^{st}$ HARQ ACK/NACK, $2^{nd}$ HARQ ACK/NACK, $3^{rd}$ HARQ ACK/NACK, and $4^{th}$ HARQ ACK/NACK), and the transmission interval (e.g., HARQ transmission interval) measured between each of the four configured HARQ transmissions is equal to 3 ms. As such, a maximum application time for second UE 804(2) (e.g., Max T2), to allow for a "worst case" scenario where all four HARQ transmissions are, indeed, used by second UE 804(2) in response to MAC-CE 808, may be greater than or equal to 9 ms (e.g., measured from the transmission/reception of $1^{st}$ HARQ ACK/NACK for second UE 804(2)). In particular, network entity 802 (e.g., in FIG. 8A) may calculate this maximum application time as:

$$\text{Max}T2 \ge [(\text{Max number of } HARQ \text{ transmissions}) - 1] *$$
$$(HARQ \text{ transmission interval})$$
$$\text{Max}T2 \ge [4 \, HARQ \text{ transmissions} - 1] * 3 \text{ ms interval}$$
$$\text{Max}T1 \ge 6 \text{ ms.}$$

The maximum application time for second UE 804(2) (e.g., Max T2) is measured from the scheduled time for the transmission of $1^{st}$ HARQ ACK/NACK for second UE 804(2) (e.g., $t_{1stHARQ,UE2}$=1 ms); thus, network entity 802 determines the absolute application time for second UE 804(2) ($t_{abs,UE2}$) as greater than or equal to the sum of the timing of the $1^{st}$ HARQ ACK/NACK scheduled for second UE 804(2) ($t_{1stHARQ,UE2}$) and Max T2 (e.g., $t_{abs,UE2}$ ?$t_{1stHARQ,UE2}$+Max T2). Accordingly, the absolute application time for second UE 804(2) ($t_{abs,UE2}$) determined by network entity 802 is greater than or equal to 10 ms (1 ms+9 ms).

Network entity 802 determines the absolute application time ($t_{abs}$) based on the absolute application time for first UE 804(1) ($t_{abs,UE1}$) and the absolute application time for second UE 804(2) ($t_{abs,UE2}$). Specifically, to allow for both "worst cases" to occur, network entity 802 determines the absolute application time ($t_{abs}$) as a maximum of $t_{abs,UE1}$ and $t_{abs,UE2}$ (e.g., $t_{abs} \ge \max(t_{abs,UE1}$ or $t_{abs,UE2}$)). Accordingly, network entity 802 determines the absolute application time ($t_{abs}$) as $t_{abs} \ge \max(7 \text{ ms or } 10 \text{ ms})$ or $t_{abs} \ge 10 \text{ ms}$. In this example, network entity 802 determines that $t_{abs}$ to be used by first UE 804(1) and second UE 804(2) is equal to 10 ms, however, in other examples, network entity 802 may determine that $t_{abs}$ to be used by first UE 804(1) and second UE 804(2) is any time value greater than 10 ms (e.g., 11 ms, 12 ms, etc.).

Returning to FIG. 8A, after determining the absolute application time (e.g., $t_{abs}$=10 ms), network entity 802 transmits MAC-CE 806 to first UE 804(1) and MAC-CE 808 to second UE 804(2). MAC-CE 806, directed for first UE 804(1), includes an indication to perform one or more actions. MAC-CE 808, directed for second UE 804(2), includes an indication to perform the same action(s) indicated in MAC-CE 806. Further, according to aspects described herein, both MAC-CE 806 and MAC-CE 808 include an indication of the absolute application time (e.g., $t_{abs}$=10 ms) for performing the one or more actions.

In a wireless communications frame structure (e.g., described above with respect to FIGS. 4A-4D), $t_{abs}$=10 ms may be associated with a particular frame, slot, and/or symbol in the wireless communications frame structure. Thus, the indication of the absolute application time included in MAC-CE 806 and/or MAC-CE 808 may include an index associated with a frame, an index associated with a slot, and/or an index associated with a symbol in a wireless communications frame structure.

First UE 804(1) is successful in receiving and decoding the first transmission of MAC-CE 806. As such, first UE 804(1) transmits a HARQ ACK message 812 after receiving MAC-CE 806.

Second UE 804(2), however, is unsuccessful in receiving and decoding the first transmission of MAC-CE 808. Accordingly, second UE 804(2) transmits a HARQ NACK message 814 to trigger re-transmission of MAC-CE 808 (e.g., as MAC-CE 816) by network entity 802. Second UE 804(2) then successfully receives and decodes MAC-CE 816 (e.g., a re-transmission of MAC-CE 808) and accordingly transmits a HARQ-ACK message 818 in response.

First UE 804(1) and second UE 804(2) perform action(s) indicated in MAC-CE 806 and MAC-CE 808 (also re-indicated in MAC-CE 816), respectively, at the absolute application time indicated in each MAC-CE. As such, first UE 804(1) and second UE 804(2) perform the indicated action(s) at time=10 ms (e.g., shown at 820 in FIG. 8A). Network entity 802 also performs the action(s) indicated in MAC-CE 806 and MAC-CE, 808 (and re-indicated in MAC-CE 816) at time=10 ms. Thus, unlike conventional solutions, here, the application times for performing the indicated action(s) are performed irrespective of when HARQ ACK transmissions are transmitted/received in response to MAC-CEs transmitted/received for first UE 804(1) and second UE 804(2). Accordingly, applications times for performing the MAC-CE-based action(s) are synchronized (e.g., aligned) across first UE 804(1), second UE 804(2), and network entity 802

Example Aspects Related to Determining an Application Time for a MAC-CE-Based Action Based on a Number of HARQ Messages Transmitted in Response to the MAC-CE In other aspects, in order to overcome technical problems associated with the alignment of application times for MAC-CE-based actions in multi-UE scenarios, such as those described above with respect to FIGS. 6 and 7, an application time for a MAC-CE-based action (e.g., indicated via a MAC-CE) may be determined, instead, based on a dynamic offset, in turn based on a number of HARQ messages transmitted in response to the MAC-CE. For example, a UE receiving a MAC-CE triggering the UE to perform an action may determine an application time for performing such action(s) based, at least in part, on whether one HARQ ACK message was transmitted for the MAC-CE, a HARQ NACK and a HARQ ACK message were transmitted for the MAC-CE (e.g., a total of two HARQ transmissions), two HARQ NACKs and a HARQ ACK were transmitted for the MAC-CE (e.g., a total of three HARQ transmissions), etc. (e.g., up to a maximum number of HARQ transmissions that may be scheduled for use by the UE in response to the MAC-CE).

In some aspects, the UE calculates the application time for a MAC-CE-based action (e.g., indicated via a MAC-CE) based on a dynamic offset from a time when a HARQ ACK message is transmitted (e.g., to a transmitter of the MAC-CE, such as a network entity) in response to the MAC-CE. The dynamic offset is determined as a sum of a maximum application time associated with the UE (Max T) minus a product of a transmission interval measured between each HARQ transmission configured for use by the UE in response to the UE (HARQ TX Interval) and the number of HARQ messages transmitted in response to the MAC-CE (# of HARQ TX) minus one. In other words, the dynamic offset is determined as $$\text{Offset} = \text{Max}T - [HARQ \text{ Interval} * (\# \text{ of } HARQ \, TX - 1)]$$

and the application time for a MAC-CE-based action is determined as $$\text{Application Time} = (\text{Time of } HARQ \, ACK \text{ message}) + (\text{Offset}).$$

The maximum application time associated with the UE (Max T) may be based on (1) a maximum number of HARQ transmissions configured (e.g., that may be scheduled) for use by UE in response to the MAC-CE (Max # of HARQ TX), (2) the transmission interval measured between each HARQ transmission configured for use by the UE in response to the MAC-CE (HARQ TX Interval), and in multi-UE scenarios, (3) a maximum number of HARQ transmissions configured (e.g., that may be scheduled) for use by other UEs in response to the MAC-CE, (4) a transmission interval measured between each HARQ transmission configured for use by other UEs in response to the UE, and/or (5) scheduling delays between HARQ transmission scheduled for the UE and HARQ transmission scheduled for the other UEs.

This value of the maximum application time associated with the UE (Max T) (e.g., calculated for the UE based on the above factors) may be calculated by a network entity and provided to the UE and/or defined in a specification (e.g., 3GPP specification).

It is noted that in some cases a UE is configured with a maximum number of HARQ transmission equal to one. Thus, in such cases, the maximum application time calculated for this UE (e.g., associated with this UE) may be equal to zero.

Figure 9:
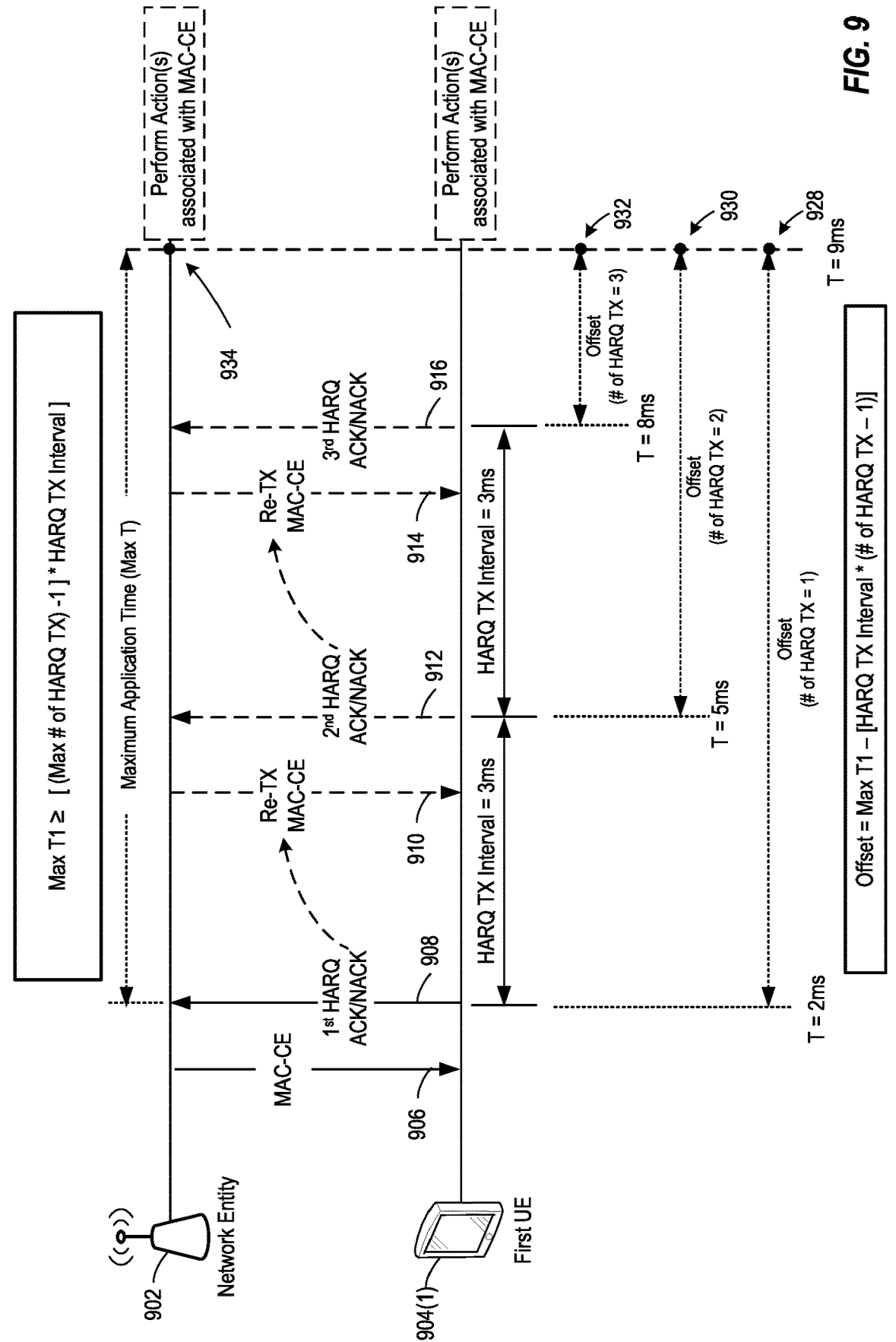
FIG. 9 depicts example application time calculations for MAC-CE-based actions based on a number of HARQ messages transmitted in response to the MAC-CE.

FIG. 9 depicts example application time calculations for MAC-CE-based actions based on a number of HARQ messages transmitted in response to the MAC-CE. FIG. 9 illustrates an example single-UE scenario where a MAC-CE 906 is transmitted from a network entity 902 to a first UE 904(1), and an application time for performing one or more actions indicated in MAC-CE 906 is determined by calculating a dynamic offset from a time when a HARQ ACK message is transmitted by first UE 904(1) in response to the MAC-CE.

Although FIG. 9 illustrates straight lines meant to depict transmissions between network entity 902 and first UE 904(1), there may propagation delay between when a transmission is sent and when the transmission is received. Although not shown, to account for this propagation delay, time advances may be applied, for example, first UE 904(1) may be configured to advance HARQ transmissions according to a TA command.

As illustrated, first UE 904(1) may be configured with a maximum number of HARQ transmissions to use in response to MAC-CE 906 equal to three (e.g., shown as $1^{st}$ HARQ ACK/NACK message 908, $2^{nd}$ HARQ ACK/NACK message 912, and $3^{rd}$ HARQ ACK/NACK message 916) and a transmission interval (HARQ TX Interval) measured between each of the three configured HARQ transmissions equal to 3 ms. Accordingly, a maximum application time for first UE 904(1) (e.g., Max T1) (e.g., to allow for a "worst case" scenario where all three HARQ transmissions are, indeed, used by first UE 904(1) in response to MAC-CE 906) may be greater than or equal to 6 ms. In particular, network entity 902 may calculate the maximum application time for first UE 904(1) (e.g., Max T1) as:

$$MaxT1 \geq [(Max \ \# \ of \ HARQ\ TX) - 1] * (HARQ\ TX \ Interval)$$

$$MaxT1 \geq [3\ HARQ\ ACK/NACK - 1] * 3 \ ms \ interval$$

$$MaxT1 \geq 6 \ ms.$$

The final decision on the value of Max T1 may be decided by network entity 902. In particular, for this example, network entity may determine that Max T1 is equal to 7 ms (e.g., 7 ms>6 ms). In other examples where Max T1≥6 ms, network entity 902 may determine that Max T1 is equal to 6 ms, 8 ms, 9 ms, 10 ms, etc.

In some aspects, to inform first UE 904(1) of Max T1 (e.g., such that first UE 904(1) is able to use this value when calculating an Offset), network entity 902 includes an indication of Max T1 in MAC-CE 906. In some aspects, to inform first UE 904(1) of Max T1, network entity 902 transmits an indication of Max T1 in a radio resource control (RRC) message (e.g., transmitted prior to a HARQ transmission scheduled to be used by first UE 904(1) in response to MAC-CE 906). In some aspects, Max T1 is defined in a specification (e.g., 3GPP specification).

As described above, first UE 904(1) uses the maximum application time for first UE 904(1) (e.g., Max T1) to calculate an application time for performing one or more actions indicated in MAC-CE 906. First UE 904(1) may further use (1) a transmission interval measured between each HARQ transmission configured for use by first UE 904(1) in response to the MAC-CE (HARQ TX Interval) and (2) a number of HARQ messages transmitted in response to the MAC-CE (# of HARQ TX) (e.g., Offset=Max T−[HARQ TX Interval*(# of HARQ TX−1)]).

Similar to Max T1, in some aspects, network entity 902 includes an indication of HARQ TX Interval in MAC-CE 906. In some aspects, network entity 902 transmits an indication of the HARQ TX Interval in an RRC message (e.g., transmitted prior to a HARQ transmission scheduled to be used by first UE 904(1) in response to MAC-CE 906). In some aspects, the HARQ TX Interval is defined in a specification (e.g., 3GPP specification).

In some aspects, the number of HARQ messages transmitted in response to the MAC-CE 906 (# of HARQ TX) is defined in a specification (e.g., 3GPP specification). Alternatively, in some aspects, to assist first UE 904(1) in determining the number of HARQ messages transmitted in response to the MAC-CE 906 (# of HARQ TX) (e.g., such that first UE 904(1) is able to use this value when calculating an Offset), network entity 902 includes an indication of the # of HARQ TX in a scheduling grant (e.g. downlink control information (DCI)) scheduling a HARQ message (and more specifically, a HARQ-ACK message) to be used by first UE 904(1) in response to MAC-CE 806.

In some aspects, the indication of the # of HARQ TX is explicitly indicated in the scheduling grant (e.g., DCI). For example, the scheduling grant may explicitly indicate that the # of HARQ TX is equal to two (e.g., indicating that a first HARQ message was previously transmitted for MAC-CE

906 and this scheduling grant schedules a second HARQ message for use by first UE 904(1) in response to MAC-CE 906).

In some other aspects, the indication of the # of HARQ TX is implicitly indicated in the scheduling grant (e.g., DCI). In particular, in some cases, the scheduling grant may include an indication of a redundancy version (RV) value of an RV pattern associated with HARQ transmissions for the MAC-CE.

As an illustrative example, network entity 902 may configure first UE 904(1) with a fixed RV pattern intended for use across HARQ transmissions/re-transmissions in a sequence (e.g., configure first UE 904(1) with the RV pattern prior in time to transmitting MAC-CE 906). The fixed RV pattern may be, for example, (0, 3, 1, 2), where RV=0 maps to a # of HARQ TX=1, RV=3 maps to a # of HARQ TX=2, RV=1 maps to a # of HARQ TX=3, and RV=0 maps to a # of HARQ TX=1. Accordingly, in a case where an RV value equal to 3 (RV=3) is included in the scheduling grant received by first UE 904(1), to schedule a next HARQ transmission for first UE 904(4), first UE 904(4) may determine that a # of HARQ TX is equal to two (e.g., RV=3 maps to # of HARQ TX=2). Should first UE 904(1) successfully receive a second transmission (e.g., a re-transmission) of MAC-CE 906 (and accordingly use the second scheduled HARQ transmission to report ACK to network entity 902), then first UE 904(1) may use # of HARQ TX=2 when calculating the application time for the action(s) indicated in MAC-CE (e.g., using Application Time=(Time of HARQ ACK message)+(Offset) and Offset=Max T−[HARQ TX Interval*(# of HARQ TX−1)]).

Cases where an indication of the # of HARQ TX is implicitly indicated in a scheduling grant (e.g., DCI) as an indication of an RV value may be limited based on the number of RV values defined in a specification (e.g., the 3GPP specification). For example, the 3GPP specification may support carrying an RV value=0, 1, 2, or 3 in the scheduling grant (e.g., a DCI) to indicate a starting position of a circular buffer during HARQ transmission/re-transmission. As such, indicating the # of HARQ TX implicitly in the as an indication of an RV value may only be used for this example where a maximum number of HARQ transmissions scheduled for use by first UE 904(1) in response to MAC-CE 906 is less than or equal to four (e.g., given only four RV values are supported by the 3GPP specification).

First UE 904(1) may be able to calculate an application time for performing MAC-CE based action(s) when first UE 904(1) has knowledge of Max T1, HARQ TX Interval, and # of HARQ TX.

For example, in a first case, network entity 902 transmits a scheduling grant (e.g., DCI, not shown in FIG. 9) to first UE 904(1) to schedule 1$^{st}$ HARQ message 908 for use by first UE 904(1) in response to MAC-CE 906. The scheduling grant may include an indication that the # of HARQ TX=1. Network entity 902 also transmits MAC-CE 906 to first UE 904(1). MAC-CE 906 indicates that first UE 904(1) is to perform one action (e.g., a deactivation).

In a first case, it is assumed that first UE 904(1) successfully receives and decodes MAC-CE 906, and thus, transmits 1st HARQ message 908 as a HARQ ACK to network entity 902. Prior to performing the action indicated in MAC-CE 906, first UE 904(1) determines an application time for performing the action. Specifically, first UE 904(1) calculates the application time as a function of an offset, where the offset is calculated as Offset=Max T−[HARQ TX Interval*(# of HARQ TX−1)]. In this example, as described earlier, network entity determines that Max T1=7 ms (e.g., 7 ms>6 ms calculated for Max T1). Accordingly, first UE 904(1) calculates the application time as:

$$\text{Offset} = \text{Max}T1 - [HARQ\,TX\ \text{Interval} * (\#\ \text{of}\ HARQ\,TX - 1)]$$

$$\text{Offset} = 7\ \text{ms} - [3\ \text{ms} * (1 - 1)]$$

$$\text{Offset} = 7\ \text{ms.}$$

First UE 904(1) uses this offset to calculate the application time as:

$$\text{Application Time} = (\text{Time of } HARQ\,ACK\ \text{message}) + (\text{Offset})$$

$$\text{Application Time} = (T = 2\ \text{ms}) + (7\ \text{ms})$$

$$\text{Application Time is Time, } T = 9\ \text{ms.}$$

Thus, first UE 904(1) performs the action indicated in MAC-CE 906 at time, T=9 ms, shown at 928 in FIG. 9. Further, network entity 902 may also perform the action indicated in MAC-CE 906, at time, T=9 ms, shown at 934 in FIG. 9.

Alternatively, in a second case, it is assumed that first UE 904(1) is unsuccessful in receiving and/or decoding MAC-CE 906, and thus, transmits 1st HARQ message 908 as a HARQ NACK to network entity 902. In response to receiving $1^{st}$ HARQ message 908, network entity 902 transmits another scheduling grant (e.g., DCI, not shown in FIG. 9) to first UE 904(1) to schedule $2^{nd}$ HARQ message 912 for use by first UE 904(1) in response to a re-transmission of MAC-CE 906 as re-transmission MAC-CE 910. The scheduling grant may include an indication that the # of HARQ=2. Network entity 902 also transmits re-transmission MAC-CE 910 to first UE 904(1). It is further assumed, for this second case, that first UE 904(1) successfully receives and decodes re-transmission MAC-CE 910, and thus, transmits $2^{nd}$ HARQ message 912 as a HARQ ACK to network entity 902.

Prior to performing the action indicated in re-transmission MAC-CE 910, first UE 904(1) determines an application time for performing the action. Specifically, first UE 904(1) calculates the application time as:

$$\text{Offset} = \text{Max}T1 - [HARQ\,TX\ \text{Interval} * (\#\ \text{of}\ HARQ\,TX - 1)]$$

$$\text{Offset} = 7\ \text{ms} - [3\ \text{ms} * (2 - 1)]$$

$$\text{Offset} = 4\ \text{ms.}$$

First UE 904(1) uses this offset to calculate the application time as:

$$\text{Application Time} = (\text{Time of } HARQ\,ACK\ \text{message}) + (\text{Offset})$$

$$\text{Application Time} = (T = 5\ \text{ms}) + (4\ \text{ms})$$

$$\text{Application Time is Time, } T = 9\ \text{ms}$$

Thus, first UE 904(1) performs the action indicated in MAC-CE 906 at time, T=9 ms, shown at 930 in FIG. 9. Further, network entity 902 may also perform the action indicated in MAC-CE 906, at time, T=9 ms, shown at 934 in FIG. 9.

Further, in a third case, it is assumed that first UE 904(1) is unsuccessful in receiving and/or decoding MAC-CE 906 as well as the re-transmission of MAC-CE 906 sent to first UE 904(1) as re-transmission MAC-CE 914. Accordingly, first UE 904(1) transmits $2^{nd}$ HARQ message 912 as a HARQ NACK to network entity 902. In response to receiving $2^{nd}$ HARQ message 912, network entity 902 transmits another scheduling grant (e.g., DCI, not shown in FIG. 9) to first UE 904(1) to schedule $3^{rd}$ HARQ message 916 for use by first UE 904(1) in response to a re-transmission of MAC-CE 906 as re-transmission MAC-CE 914. The scheduling grant may include an indication that the # of HARQ=3. Network entity 902 also transmits re-transmission MAC-CE 914 to first UE 904(1). It is further assumed, for this third case, that first UE 904(1) successfully receives and decodes re-transmission MAC-CE 914, and thus, transmits $3^{rd}$ HARQ message 916 as a HARQ ACK to network entity 902.

Prior to performing the action indicated in re-transmission MAC-CE 914, first UE 904(1) determines an application time for performing the action. Specifically, first UE 904(1) calculates the application time as:

$$\text{Offset} = \text{Max}T1 - [HARQ\,TX\ \text{Interval} * (\#\ \text{of}\ HARQ\,TX - 1)]$$

$$\text{Offset} = 7\ \text{ms} - [3\ \text{ms} * (3 - 1)]$$

$$\text{Offset} = 1\ \text{ms.}$$

First UE 904(1) uses this offset to calculate the application time as:

$$\text{Application Time} = (\text{Time of } HARQ\,ACK\ \text{message}) + (\text{Offset})$$

$$\text{Application Time} = (T = 8\ \text{ms}) + (1\ \text{ms})$$

$$\text{Application Time is Time, } T = 9\ \text{ms}$$

Thus, first UE 904(1) performs the action indicated in MAC-CE 906 at time, T=9 ms, shown at 932 in FIG. 9. Further, network entity 902 may also perform the action indicated in MAC-CE 906, at time, T=9 ms, shown at 934 in FIG. 9.

Accordingly, irrespective of whether one, two, or three HARQ messages are transmitted by first UE 904(1) in response to MAC-CE 906 (and its corresponding retransmissions, such as re-transmission MAC-CE 910 and re-transmission MAC-CE 914), and/or when they are sent, first UE 904(1) determines the application time for performing the MAC-CE-based action is at time, T=9 ms.

As mentioned above, FIG. 9 depicts an example where a MAC-CE is used to trigger a single UE to perform one or more actions at an application time determined based on a dynamic offset. However, in some cases, the MAC-CE may be sent to multiple UEs to trigger each recipient UE to perform the action(s) synchronously. In such cases, as described above with respect to FIG. 6, there may be variations in scheduling times of MAC-CEs, and their corresponding HARQ transmissions, for the recipient UEs. Further, in such cases, as described above with respect to FIG. 7, a maximum number of HARQ transmissions scheduled for each of the recipient UEs and/or a transmission interval measured between each HARQ transmission for each of the recipient UEs may be different. Accordingly, when calculating the application time using the Application Time, Offset, and Maximum Application Time equations described above, these differences may need to be accounted for.

Figure 10:
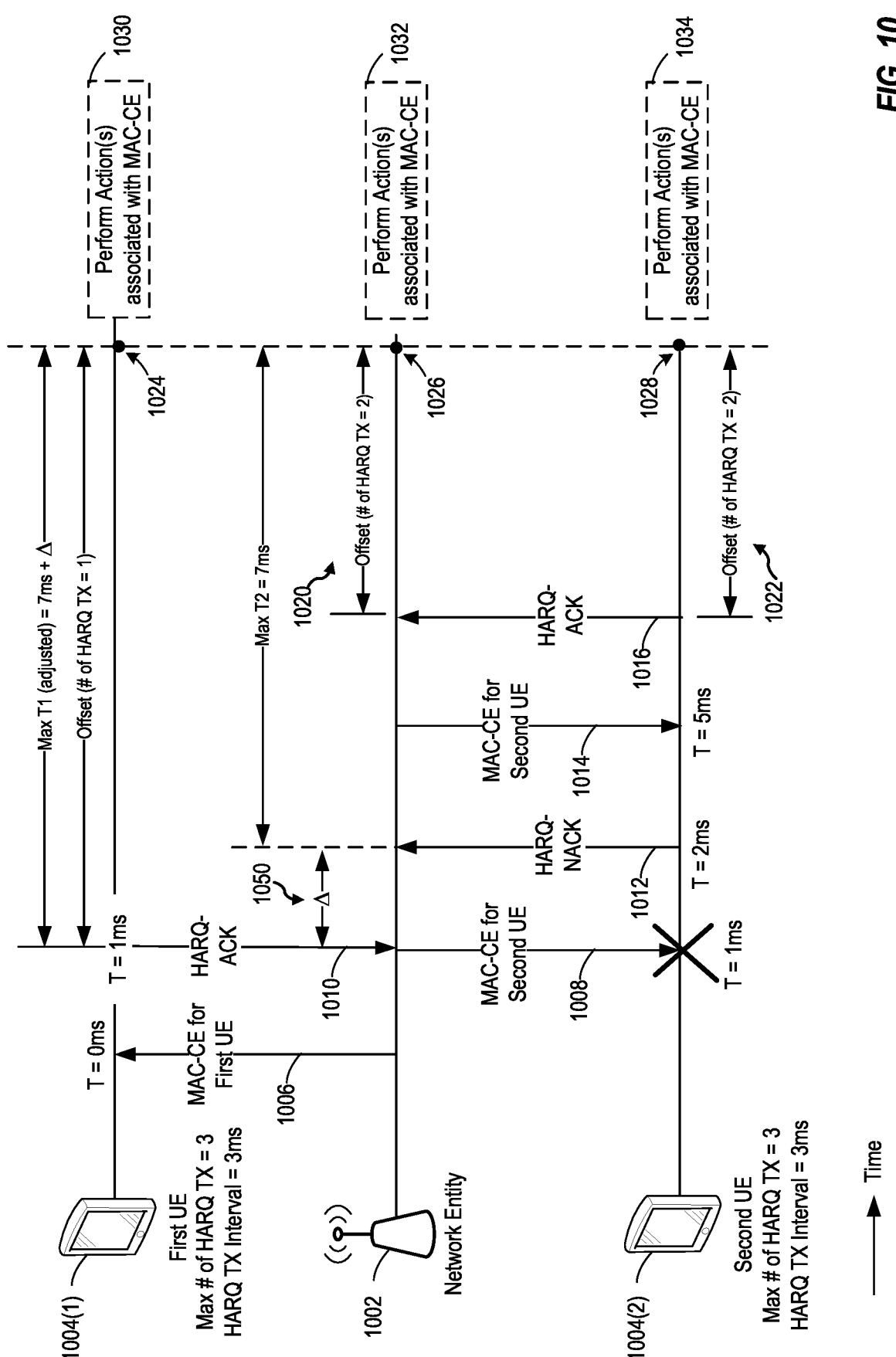
FIG. 10 illustrates an example multiple UE (multi-UE) scenario where application time calculations for MAC-CE-based actions consider scheduling delays between one or more UEs.

For example, as illustrated in FIG. 10, delays in MAC-CE and HARQ transmission scheduling times may be accounted for when calculating the maximum application time for each UE. This application time is then used to calculate the Offset, which is then used to calculate the Application Time. Accordingly, the scheduling delay may be taken into consideration in this case when determining the application time.

Network entity 1002 and first UE 1004(1) in FIG. 10 correspond to network entity 902 and first UE 904(1) in FIG. 9. As described in FIG. 9 with respect to first UE 904(1), and similarly applied to first UE 1004(1) in FIG. 10, first UE 1004(1) is configured with a maximum number of HARQ transmissions to use in response to a MAC-CE 1006 (Max # of HARQ TX) equal to three and a transmission interval (HARQ TX Interval) measured between each of the three configured HARQ transmissions is equal to 3 ms. Accordingly, a maximum application time for first UE 1004(1) (e.g., Max T1) (e.g., to allow for a "worst case" scenario where all three HARQ transmissions are, indeed, used by first UE 1004(1) in response to MAC-CE 1006) may be greater than or equal to 6 ms. In particular, network entity 1002 may calculate the maximum application time for first UE 904(1) (e.g., Max T1) as:

$$\mathrm{Max}T1 \ge [(\mathrm{Max}\ \#\ \mathrm{of}\ HARQ\ TX) - 1] * (HARQ\ TX\ \mathrm{Interval})$$

$$\mathrm{Max}T1 \ge [3\ HARQ\ ACK/NACK - 1] * 3\ \mathrm{ms\ interval}$$

$$\mathrm{Max}T1 \ge 6\ \mathrm{ms}.$$

For this example, network entity may determine that Max T1 is equal to 7 ms, given 7 ms is greater than 6 ms.

Different from FIG. 9 though, in FIG. 10, another MAC-CE 1008 (e.g., indicating similar action(s) as MAC-CE 1006) is also transmitted to second UE 1004(2). Second UE 1004(2) may be configured with a same Max # of HARQ TX and a same HARQ TX Interval as first UE 1004(1). Accordingly network entity 1002 may calculate the maximum application time for first UE 904(1) (e.g., Max T2) as:

$$\mathrm{Max}T2 \ge [(\mathrm{Max}\ \#\ \mathrm{of}\ HARQ\ TX) - 1] * (HARQ\ TX\ \mathrm{Interval})$$

$$\mathrm{Max}T2 \ge [3\ HARQ\ ACK/NACK - 1] * 3\ \mathrm{ms\ interval}$$

$$\mathrm{Max}T2 \ge 6\ \mathrm{ms}$$

and determine that Max T2 is also equal to 7 ms, given 7 ms is greater than 6 ms.

In FIG. 10, however, MAC-CE for second UE 1004(2) is delayed by 1 ms from when MAC-CE 1006 is transmitted to first UE 1004(1). Accordingly, an initial HARQ transmission scheduled for use by second UE 1004(2) in response to MAC-CE 10008 may also be delayed by 1 ms (e.g., delay is illustrated as A, at 1050, in FIG. 10).

Thus, to assist in the alignment of application times by first UE 1004(1) and second UE 1004(2) of action(s) indicated in MAC-CE 1006 and MAC-CE 1008, respectively, network entity 1002 adjusts Max T1 calculated for first UE 1004(1). In particular, the maximum application time for first UE 1004(1) is calculated as:

$$\mathrm{Max}T1(\mathrm{adjusted}) = \mathrm{Max}T1 + \Delta$$

$$\mathrm{Max}T1(\mathrm{adjusted}) = 7\ \mathrm{ms} + 1\ \mathrm{ms}$$

$$\mathrm{Max}T1(\mathrm{adjusted}) = 8\ \mathrm{ms}$$

where $\Delta$ represents the delay between a first HARQ transmission scheduled for first UE 1004(1) (e.g., HARQ message 1010) and a first HARQ transmission scheduled for second UE 1004(2) (e.g., HARQ message 1012).

This Max T1 (adjusted) value may be provided to first UE 1004(1), such that first UE 1004(1) uses Max T1 (adjusted) instead of Max T1 when calculating the application, using:

$$\mathrm{Offset} = \mathrm{Max}T1(\mathrm{adjusted}) = [HARQ\ TX\ \mathrm{Interval} * (\#\ \mathrm{of}\ HARQ\ TX - 1)]$$

and $$\mathrm{Application\ Time} = (\mathrm{Time\ of}\ HARQ\ ACK\ \mathrm{message}) + (\mathrm{Offset}).$$

In this example, no adjustment to the maximum application time for second UE 1004(2) (Max T2) is necessary.

By accounting for the delay in initial HARQ transmissions between the two UEs when calculating the maximum application time for first UE 1004(1), first UE 1004(1) may not need to be aware of such delay. In particular, among network entity 1002, first UE 1004(1), and second UE 1004(2), only network entity 1002 may have knowledge of the delay, and thus account for the delay when calculating the maximum application time for first UE 1004(1).

In some aspects, in addition to or alternative to having misaligned HARQ transmissions, a maximum number of HARQ transmissions (Max # of HARQ TX) and/or a transmission interval measured between each HARQ transmission (HARQ TX Interval) may be different among multiple UEs. As such, a network entity transmitting MAC-CE to each of the multiple UEs may account for differences in these values by adjusting the maximum application time determined for each UE accordingly.

Although FIG. 10 illustrates straight lines meant to depict transmissions between network entity 1002, first UE 1004(1), and second UE 1004(2), there may propagation delay between when a transmission is sent and when the transmission is received. Although not shown, to account for this propagation delay, time advances may be applied, for example, first UE 1004(1) may be configured to advance HARQ transmissions according to a TA command.

Example Operations

Figure 11:
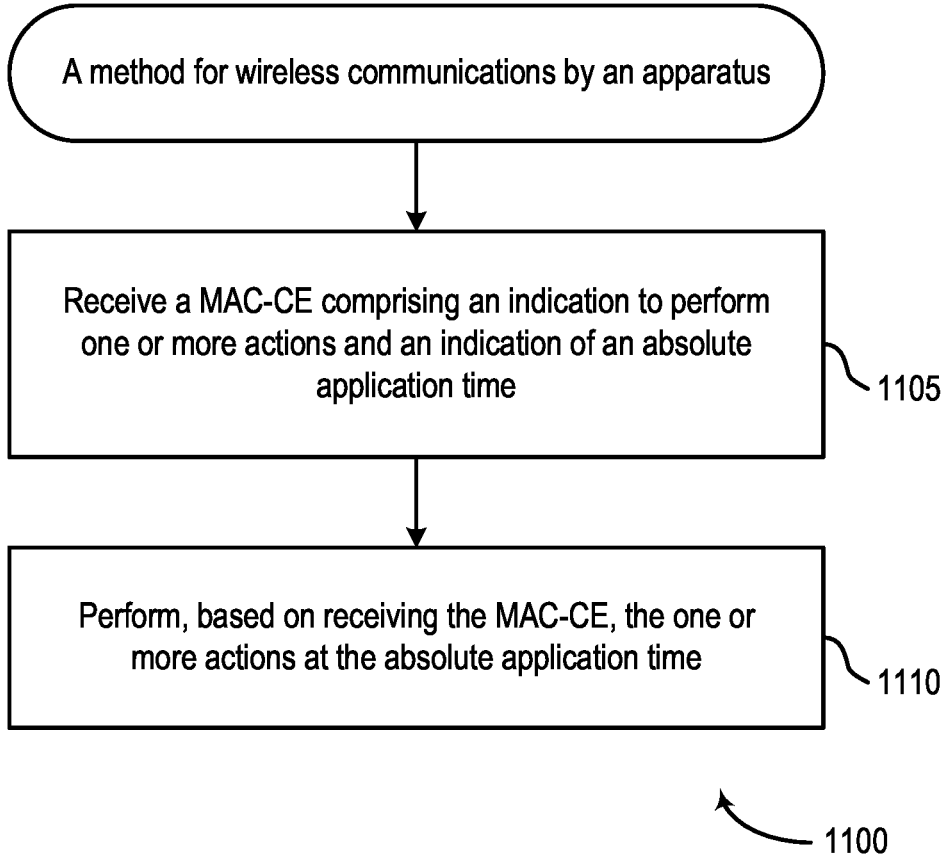
FIG. 11 depicts a method for wireless communications.

FIG. 11 shows a method 1100 for wireless communications by an apparatus, such as UE 104 of FIGS. 1 and 3.

Method 1100 begins at step 1105 with receiving a MAC-CE comprising an indication to perform one or more actions and an indication of an absolute application time.

Method 1100 then proceeds to step 1110 with performing, based on receiving the MAC-CE, the one or more actions at the absolute application time.

In certain aspects, the absolute application time is configured based on at least one of: a number of HARQ transmissions scheduled for use by the apparatus in response to the MAC-CE, a transmission time between each HARQ transmission scheduled for use by the apparatus in response to the MAC-CE, a timing of a first HARQ transmission scheduled for use by the apparatus in response to the MAC-CE, a number of HARQ transmissions scheduled for use by each of one or more other apparatuses in response to the MAC-CE, a transmission time between each HARQ transmission scheduled for use by each of the one or more other apparatuses in response to the MAC-CE, or a timing of a first HARQ transmission scheduled for use by at least one of the one or more other apparatuses in response to the MAC-CE.

In certain aspects, the indication of the absolute application time comprises an index associated with a frame in a wireless communications frame structure.

In certain aspects, the indication of the absolute application time comprises an index associated with a slot in a wireless communications frame structure.

In certain aspects, the indication of the absolute application time comprises an index associated with a symbol in a wireless communications frame structure.

In certain aspects, the one or more actions comprise at least one of: a secondary cell activation or deactivation, a TCI state switch, an uplink spatial relation switch, or configuring a timing advance.

In certain aspects, method 1100 further includes receiving the MAC-CE via multicast signaling.

Figure 15:
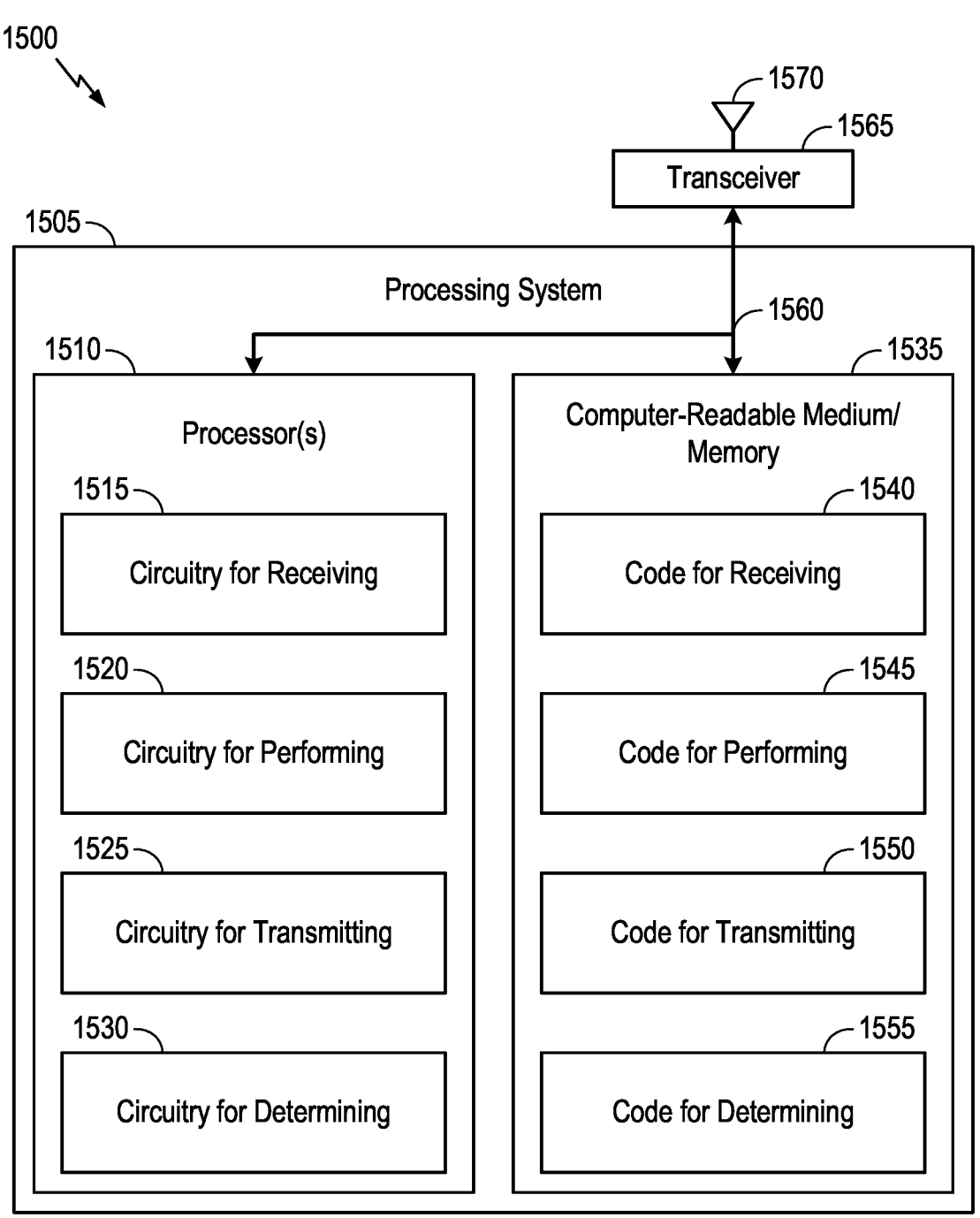
FIG. 15 depicts aspects of an example communications device.

In certain aspects, method 1100, or any aspect related to it, may be performed by an apparatus, such as communications device 1500 of FIG. 15, which includes various components operable, configured, or adapted to perform the method 1100. Communications device 1500 is described below in further detail.

Note that FIG. 11 is just one example of a method, and other methods including fewer, additional, or alternative steps are possible consistent with this disclosure.

Figure 12:
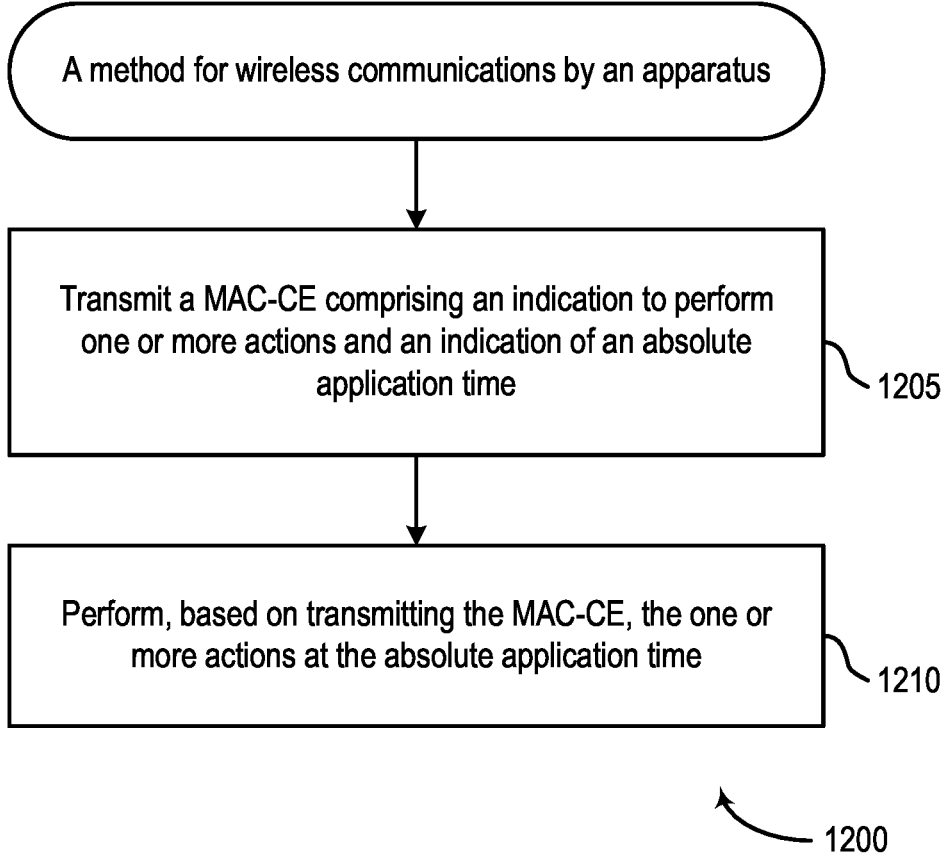
FIG. 12 depicts another method for wireless communications.

FIG. 12 shows a method 1200 for wireless communications by an apparatus, such as BS 102 of FIGS. 1 and 3, or a disaggregated base station as discussed with respect to FIG. 2.

Method 1200 begins at step 1205 with transmitting a MAC-CE comprising an indication to perform one or more actions and an indication of an absolute application time.

Method 1200 then proceeds to step 1210 with performing, based on transmitting the MAC-CE, the one or more actions at the absolute application time.

In certain aspects, method 1200 further includes determining the absolute application time based on at least one of: a number of HARQ transmissions scheduled for use by one or more intended receivers of the MAC-CE, a transmission time between each HARQ transmission scheduled for use by the one or more intended receivers of the MAC-CE, or a timing of a first HARQ transmission scheduled for use by the one or more intended receivers of the MAC-CE.

In certain aspects, the indication of the absolute application time comprises an index associated with a frame in a wireless communications frame structure.

In certain aspects, the indication of the absolute application time comprises an index associated with a slot in a wireless communications frame structure.

In certain aspects, the indication of the absolute application time comprises an index associated with a symbol in a wireless communications frame structure.

In certain aspects, the one or more actions comprise at least one of: a secondary cell activation or deactivation, a TCI state switch, an uplink spatial relation switch, or configuring a timing advance.

In certain aspects, method 1200 further includes transmitting the MAC-CE via multicast signaling.

Figure 16:
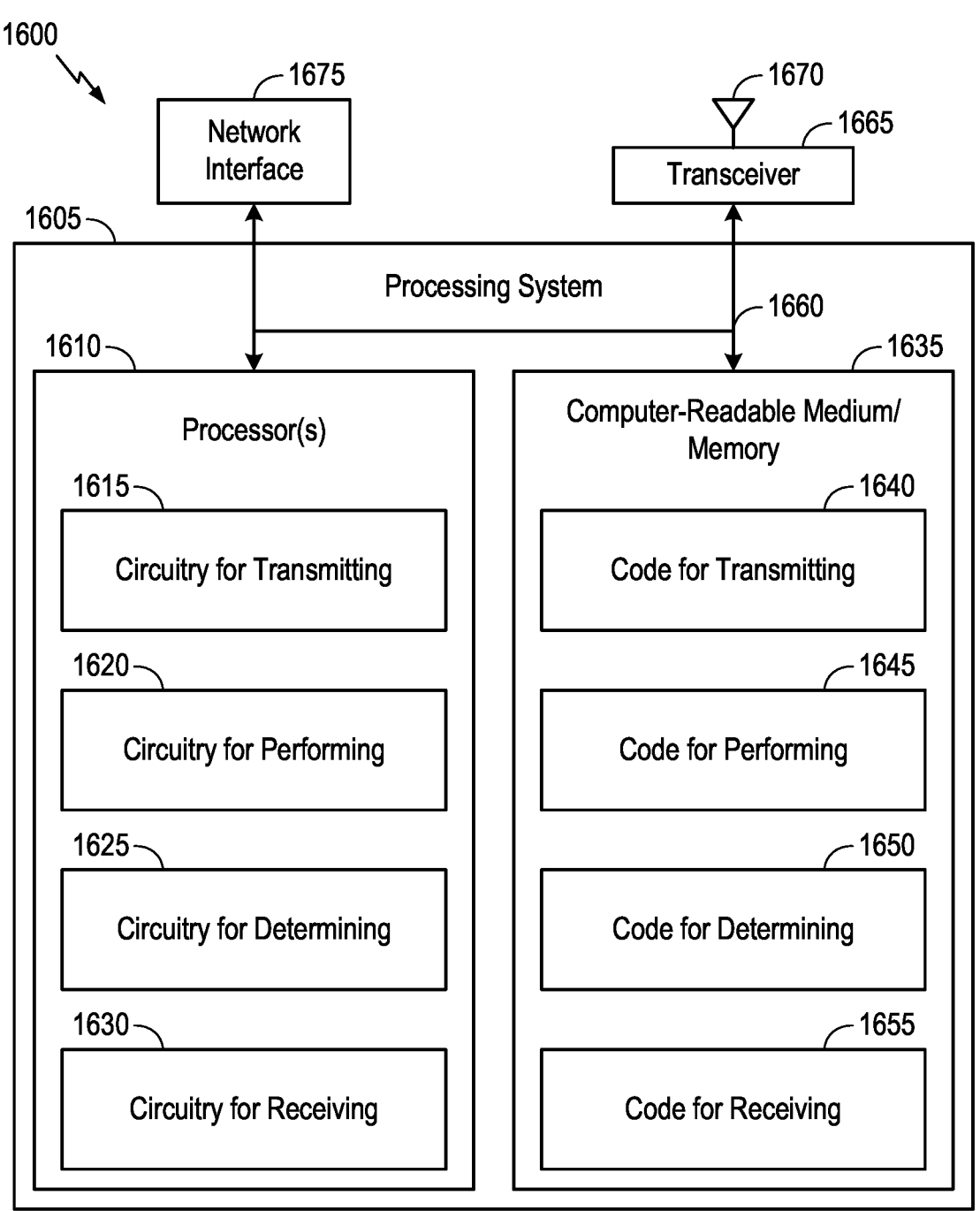
FIG. 16 depicts aspects of an example communications device.

In certain aspects, method 1200, or any aspect related to it, may be performed by an apparatus, such as communications device 1600 of FIG. 16, which includes various components operable, configured, or adapted to perform the method 1200. Communications device 1600 is described below in further detail.

Note that FIG. 12 is just one example of a method, and other methods including fewer, additional, or alternative steps are possible consistent with this disclosure.

FIG. 13 shows a method 1300 for wireless communications by an apparatus, such as UE 104 of FIGS. 1 and 3.

Method 1300 begins at step 1305 with receiving a MAC-CE comprising an indication to perform one or more actions.

Method 1300 then proceeds to step 1310 with transmitting a HARQ ACK transmission based on receiving the MAC-CE.

Method 1300 then proceeds to step 1315 with determining an application time for performing the one or more actions based on a number of HARQ transmissions transmitted in response to the MAC-CE, including the HARQ ACK transmission.

Method 1300 then proceeds to step 1320 with performing the one or more actions at the application time.

In certain aspects, method 1300 further includes, prior to transmitting the HARQ ACK transmission, receiving DCI scheduling the HARQ ACK transmission.

In certain aspects, the DCI scheduling the HARQ ACK transmission comprises an indication of the number of HARQ transmissions, and the method 1300 further includes determining the number of HARQ transmissions based on the indication of the number of HARQ transmissions.

In certain aspects, the indication of the number of HARQ transmissions included in the DCI comprises an RV value associated with an RV pattern associated with HARQ transmissions for the MAC-CE.

In certain aspects, the RV pattern associated with the HARQ transmissions for the MAC-CE is defined in a specification.

In certain aspects, method 1300 further includes receiving an indication of the RV pattern associated with the HARQ transmissions for the MAC-CE.

In certain aspects, method 1300 further includes receiving the indication of the RV in an RRC message.

In certain aspects, the indication of the number of HARQ transmissions is explicitly indicated in the DCI.

In certain aspects, method 1300 further includes determining the application time for performing the one or more actions further based on: a transmission time between each HARQ transmission scheduled for use by the apparatus in response to the MAC-CE; and a maximum application time associated with the apparatus.

In certain aspects, the application time is calculated based on an offset from a time when the HARQ ACK transmission is transmitted; and the offset is determined as the maximum application time associated with the apparatus minus a product of the transmission time between each HARQ transmission and the number of HARQ transmissions minus one.

In certain aspects, the MAC-CE further comprises an indication of the transmission time between each HARQ transmission scheduled for use by the apparatus for the MAC-CE.

In certain aspects, method 1300 further includes, prior to transmitting the HARQ ACK transmission, receiving an indication of the transmission time between each HARQ transmission in an RRC message.

In certain aspects, the transmission time between each HARQ transmission scheduled for use by the apparatus for the MAC-CE is defined in a specification.

In certain aspects, the maximum application time is configured based on at least one of: a number of HARQ transmissions scheduled for use by the apparatus in response to the MAC-CE, a transmission time between each HARQ transmission scheduled for use by the apparatus in response to the MAC-CE, a number of HARQ transmissions scheduled for use by each of one or more other apparatuses in response to the MAC-CE, a transmission time between each HARQ transmission scheduled for use by each of the one or more other apparatuses in response to the MAC-CE, or a time difference between a first HARQ transmission scheduled for use by the apparatus for the MAC-CE and a first HARQ transmission scheduled for use by at least one of the one or more other apparatuses in response to the MAC-CE.

In certain aspects, the MAC-CE further comprises an indication of the maximum application time associated with the apparatus.

In certain aspects, method 1300 further includes, prior to transmitting the HARQ ACK transmission, receiving an indication of the maximum application time associated with the apparatus in an RRC message.

In certain aspects, the maximum application time associated with the apparatus is defined in a specification.

In certain aspects, the one or more actions comprise at least one of: a secondary cell activation or deactivation, a TCI state switch, an uplink spatial relation switch, or configuring a timing advance.

In certain aspects, method 1300 further includes receiving the MAC-CE via multicast signaling.

In certain aspects, method 1300, or any aspect related to it, may be performed by an apparatus, such as communications device 1500 of FIG. 15, which includes various components operable, configured, or adapted to perform the method 1300. Communications device 1500 is described below in further detail.

Note that FIG. 13 is just one example of a method, and other methods including fewer, additional, or alternative steps are possible consistent with this disclosure.

FIG. 14 shows a method 1400 for wireless communications by an apparatus, such as BS 102 of FIGS. 1 and 3, or a disaggregated base station as discussed with respect to FIG. 2.

Method 1400 begins at step 1405 with transmitting, to a UE, a MAC-CE comprising an indication to perform one or more actions.

Method 1400 then proceeds to step 1410 with receiving, from the UE, a HARQ ACK transmission in response to the MAC-CE.

Method 1400 then proceeds to step 1415 with determining an application time for performing the one or more actions based on a timing when a first HARQ transmission was received in response to the MAC-CE from the UE and a maximum application time associated with the UE.

Method 1400 then proceeds to step 1420 with performing the one or more actions at the application time.

In certain aspects, method 1400 further includes determining the maximum application time associated with the UE based on at least one of: a number of HARQ transmissions scheduled for use by the UE in response to the MAC-CE, a transmission time between each HARQ transmission scheduled for use by the UE in response to the MAC-CE, a number of HARQ transmissions scheduled for use by each of one or more other UEs in response to the MAC-CE, a transmission time between each HARQ transmission scheduled for use by each of the one or more other UEs in response to the MAC-CE, or a time difference between the first HARQ transmission scheduled for use by the UE in response to the MAC-CE and a first HARQ transmission scheduled for use by at least one of the one or more other UEs in response to the MAC-CE.

In certain aspects, method 1400 further includes, prior to receiving the HARQ ACK transmission, transmitting one or more DCI, each DCI scheduling a HARQ transmission in response to the MAC-CE.

In certain aspects, each DCI scheduling the HARQ transmission comprises an indication of a number of HARQ transmissions scheduled for use by the UE in response to the MAC-CE.

In certain aspects, the indication of the number of HARQ transmissions scheduled for the MAC-CE included in the DCI comprises an RV value associated with an RV pattern associated with HARQ transmissions for the MAC-CE.

In certain aspects, the RV pattern associated with the HARQ transmissions for the MAC-CE is defined in a specification.

In certain aspects, method 1400 further includes transmitting an indication of the RV pattern associated with the HARQ transmissions for the MAC-CE.

In certain aspects, method 1400 further includes transmitting the indication of the RV in an RRC message.

In certain aspects, the indication of the number of HARQ transmissions scheduled for use by the UE in response to the MAC-CE is explicitly indicated in each DCI.

In certain aspects, the MAC-CE further comprises an indication of a transmission time between each HARQ transmission scheduled for use by the UE for the MAC-CE.

In certain aspects, method 1400 further includes, prior to transmitting the HARQ ACK transmission, transmitting an indication of a transmission time between each HARQ transmission scheduled for use by the UE for the MAC-CE in an RRC message.

In certain aspects, the MAC-CE further comprises an indication of the maximum application time associated with the UE.

In certain aspects, method 1400 further includes, prior to receiving the HARQ ACK transmission, transmitting an indication of the maximum application time associated with the UE in an RRC message.

In certain aspects, the one or more actions comprise at least one of: a secondary cell activation or deactivation, a TCI state switch, an uplink spatial relation switch, or configuring a timing advance.

In certain aspects, method 1400 further includes transmitting the MAC-CE via multicast signaling.

In certain aspects, method 1400, or any aspect related to it, may be performed by an apparatus, such as communications device 1600 of FIG. 16, which includes various components operable, configured, or adapted to perform the method 1400. Communications device 1600 is described below in further detail.

Note that FIG. 14 is just one example of a method, and other methods including fewer, additional, or alternative steps are possible consistent with this disclosure.

Example Communications Devices

FIG. 15 depicts aspects of an example communications device 1500. In some aspects, communications device 1500 is a user equipment, such as UE 104 described above with respect to FIGS. 1 and 3.

The communications device 1500 includes a processing system 1505 coupled to a transceiver 1565 (e.g., a transmitter and/or a receiver). The transceiver 1565 is configured to transmit and receive signals for the communications device 1500 via an antenna 1570, such as the various signals as described herein. The processing system 1505 may be configured to perform processing functions for the communications device 1500, including processing signals received and/or to be transmitted by the communications device 1500.

The processing system 1505 includes one or more processors 1510. In various aspects, the one or more processors 1510 may be representative of one or more of receive processor 358, transmit processor 364, TX MIMO processor 366, and/or controller/processor 380, as described with respect to FIG. 3. The one or more processors 1510 are coupled to a computer-readable medium/memory 1535 via a bus 1560. In certain aspects, the computer-readable medium/memory 1535 is configured to store instructions (e.g., computer-executable code) that when executed by the one or more processors 1510, enable and cause the one or more processors 1510 to perform the method 1100 described with respect to FIG. 11, or any aspect related to it, including any additional steps or sub-steps described in relation to FIG. 11; and the method 1300 described with respect to FIG. 13, or any aspect related to it, including any additional steps or sub-steps described in relation to FIG. 13. Note that reference to a processor performing a function of communications device 1500 may include one or more processors performing that function of communications device 1500, such as in a distributed fashion.

In the depicted example, computer-readable medium/memory 1535 stores code for receiving 1540, code for performing 1545, code for transmitting 1550, and code for determining 1555. Processing of the code 1540-1555 may enable and cause the communications device 1500 to perform the method 1100 described with respect to FIG. 11, or any aspect related to it; and the method 1300 described with respect to FIG. 13, or any aspect related to it.

The one or more processors 1510 include circuitry configured to implement (e.g., execute) the code stored in the computer-readable medium/memory 1535, including circuitry for receiving 1515, circuitry for performing 1520, circuitry for transmitting 1525, and circuitry for determining 1530. Processing with circuitry 1515-1530 may enable and cause the communications device 1500 to perform the method 1100 described with respect to FIG. 11, or any aspect related to it; and the method 1300 described with respect to FIG. 13, or any aspect related to it.

More generally, means for communicating, transmitting, sending or outputting for transmission may include the transceivers 354, antenna(s) 352, transmit processor 364, TX MIMO processor 366, and/or controller/processor 380 of the UE 104 illustrated in FIG. 3, transceiver 1565 and/or antenna 1570 of the communications device 1500 in FIG. 15, and/or one or more processors 1510 of the communications device 1500 in FIG. 15. Means for communicating, receiving or obtaining may include the transceivers 354, antenna(s) 352, receive processor 358, and/or controller/processor 380 of the UE 104 illustrated in FIG. 3, transceiver 1565 and/or antenna 1570 of the communications device 1500 in FIG. 15, and/or one or more processors 1510 of the communications device 1500 in FIG. 15.

FIG. 16 depicts aspects of an example communications device 1600. In some aspects, communications device 1600 is a network entity, such as BS 102 of FIGS. 1 and 3, or a disaggregated base station as discussed with respect to FIG. 2.

The communications device 1600 includes a processing system 1605 coupled to a transceiver 1665 (e.g., a transmitter and/or a receiver) and/or a network interface 1675. The transceiver 1665 is configured to transmit and receive signals for the communications device 1600 via an antenna 1670, such as the various signals as described herein. The network interface 1675 is configured to obtain and send signals for the communications device 1600 via communications link(s), such as a backhaul link, midhaul link, and/or fronthaul link as described herein, such as with respect to FIG. 2. The processing system 1605 may be configured to perform processing functions for the communications device 1600, including processing signals received and/or to be transmitted by the communications device 1600.

The processing system 1605 includes one or more processors 1610. In various aspects, one or more processors 1610 may be representative of one or more of receive processor 338, transmit processor 320, TX MIMO processor 330, and/or controller/processor 340, as described with respect to FIG. 3. The one or more processors 1610 are coupled to a computer-readable medium/memory 1635 via a bus 1660. In certain aspects, the computer-readable medium/memory 1635 is configured to store instructions (e.g., computer-executable code) that when executed by the one or more processors 1610, enable and cause the one or more processors 1610 to perform the method 1200 described with respect to FIG. 12, or any aspect related to it, including any additional steps or sub-steps described in relation to FIG. 12; and the method 1400 described with respect to FIG. 14, or any aspect related to it, including any additional steps or sub-steps described in relation to FIG. 14. Note that reference to a processor of communications device 1600 performing a function may include one or more processors of communications device 1600 performing that function, such as in a distributed fashion.

In the depicted example, the computer-readable medium/memory 1635 stores code for transmitting 1640, code for performing 1645, code for determining 1650, and code for receiving 1655. Processing of the code 1640-1655 may enable and cause the communications device 1600 to perform the method 1200 described with respect to FIG. 12, or any aspect related to it; and the method 1400 described with respect to FIG. 14, or any aspect related to it.

The one or more processors 1610 include circuitry configured to implement (e.g., execute) the code stored in the computer-readable medium/memory 1635, including circuitry for transmitting 1615, circuitry for performing 1620, circuitry for determining 1625, and circuitry for receiving 1630. Processing with circuitry 1615-1630 may enable and cause the communications device 1600 to perform the method 1200 described with respect to FIG. 12, or any aspect related to it; and the method 1400 described with respect to FIG. 14, or any aspect related to it.

More generally, means for communicating, transmitting, sending or outputting for transmission may include the transceivers 332, antenna(s) 334, transmit processor 320, TX MIMO processor 330, and/or controller/processor 340 of the BS 102 illustrated in FIG. 3, transceiver 1665 and/or antenna 1670 of the communications device 1600 in FIG. 16, and/or one or more processors 1610 of the communications device 1600 in FIG. 16. Means for communicating, receiving or obtaining may include the transceivers 332, antenna(s) 334, receive processor 338, and/or controller/processor 340 of the BS 102 illustrated in FIG. 3, transceiver 1665 and/or antenna 1670 of the communications device 1600 in FIG. 16, and/or one or more processors 1610 of the communications device 1600 in FIG. 16.

Example Clauses

Implementation examples are described in the following numbered clauses:

Clause 1: A method for wireless communications by an apparatus, comprising: receiving a MAC-CE comprising an indication to perform one or more actions and an indication of an absolute application time; and based on receiving the MAC-CE, performing the one or more actions at the absolute application time.

Clause 2: The method of Clause 1, wherein the absolute application time is configured based on at least one of: a number of HARQ transmissions scheduled for use by the apparatus in response to the MAC-CE, a transmission time between each HARQ transmission scheduled for use by the apparatus in response to the MAC-CE, a timing of a first HARQ transmission scheduled for use by the apparatus in response to the MAC-CE, a number of HARQ transmissions scheduled for use by each of one or more other apparatuses in response to the MAC-CE, a transmission time between each HARQ transmission scheduled for use by each of the one or more other apparatuses in response to the MAC-CE, or a timing of a first HARQ transmission scheduled for use by at least one of the one or more other apparatuses in response to the MAC-CE.

Clause 3: The method of any one of Clauses 1-2, wherein the indication of the absolute application time comprises an index associated with a frame in a wireless communications frame structure.

Clause 4: The method of any one of Clauses 1-3, wherein the indication of the absolute application time comprises an index associated with a slot in a wireless communications frame structure.

Clause 5: The method of any one of Clauses 1-4, wherein the indication of the absolute application time comprises an index associated with a symbol in a wireless communications frame structure.

Clause 6: The method of any one of Clauses 1-5, wherein the one or more actions comprise at least one of: a secondary cell activation or deactivation, a TCI state switch, an uplink spatial relation switch, or configuring a timing advance.

Clause 7: The method of any one of Clauses 1-6, further comprising receiving the MAC-CE via multicast signaling.

Clause 8: A method for wireless communications by an apparatus, comprising: receiving a MAC-CE comprising an indication to perform one or more actions; transmitting a HARQ ACK transmission based on receiving the MAC-CE; determining an application time for performing the one or more actions based on a number of HARQ transmissions transmitted in response to the MAC-CE, including the HARQ ACK transmission; and performing the one or more actions at the application time.

Clause 9: The method of Clause 8, further comprising, prior to transmitting the HARQ ACK transmission, receiving DCI scheduling the HARQ ACK transmission.

Clause 10: The method of Clause 9, wherein: the DCI scheduling the HARQ ACK transmission comprises an indication of the number of HARQ transmissions, and the method further comprises determining the number of HARQ transmissions based on the indication of the number of HARQ transmissions.

Clause 11: The method of Clause 10, wherein the indication of the number of HARQ transmissions MAC-CE included in the DCI comprises an RV value associated with an RV pattern associated with HARQ transmissions for the MAC-CE.

Clause 12: The method of Clause 11, wherein the RV pattern associated with the HARQ transmissions for the MAC-CE is defined in a specification.

Clause 13: The method of Clause 11, further comprising receiving an indication of the RV pattern associated with the HARQ transmissions for the MAC-CE.

Clause 14: The method of Clause 13, further comprising receiving the indication of the RV in an RRC message.

Clause 15: The method of Clause 10, wherein the indication of the number of HARQ transmissions is explicitly indicated in the DCI.

Clause 16: The method of any one of Clauses 8-15, further comprising determining the application time for performing the one or more actions further based on: a transmission time between each HARQ transmission scheduled for use by the apparatus in response to the MAC-CE; and a maximum application time associated with the apparatus.

Clause 17: The method of Clause 16, wherein: the application time is calculated based on an offset from a time when the HARQ ACK transmission is transmitted; and the offset is determined as the maximum application time associated with the apparatus minus a product of the transmission time between each HARQ transmission and the number of HARQ transmissions minus one.

Clause 18: The method of Clause 16, wherein the MAC-CE further comprises an indication of the transmission time between each HARQ transmission scheduled for use by the apparatus for the MAC-CE.

Clause 19: The method of Clause 16, further comprising, prior to transmitting the HARQ ACK transmission, receiving an indication of the transmission time between each HARQ transmission in an RRC message.

Clause 20: The method of Clause 16, wherein the transmission time between each HARQ transmission scheduled for use by the apparatus for the MAC-CE is defined in a specification.

Clause 21: The method of Clause 16, wherein the maximum application time is configured based on at least one of: a number of HARQ transmissions scheduled for use by the apparatus in response to the MAC-CE, a transmission time between each HARQ transmission scheduled for use by the apparatus in response to the MAC-CE, a number of HARQ transmissions scheduled for use by each of one or more other apparatuses in response to the MAC-CE, a transmission time between each HARQ transmission scheduled for use by each of the one or more other apparatuses in response to the MAC-CE, or a time difference between a first HARQ transmission scheduled for use by the apparatus for the MAC-CE and a first HARQ transmission scheduled for use by at least one of the one or more other apparatuses in response to the MAC-CE.

Clause 22: The method of Clause 16, wherein the MAC-CE further comprises an indication of the maximum application time associated with the apparatus.

Clause 23: The method of Clause 16, further comprising, prior to transmitting the HARQ ACK transmission, receiving an indication of the maximum application time associated with the apparatus in an RRC message.

Clause 24: The method of Clause 19, wherein the maximum application time associated with the apparatus is defined in a specification.

Clause 25: The method of any one of Clauses 8-24, wherein the one or more actions comprise at least one of: a secondary cell activation or deactivation, a TCI state switch, an uplink spatial relation switch, or configuring a timing advance.

Clause 26: The method of any one of Clauses 8-25, further comprising receiving the MAC-CE via multicast signaling.

Clause 27: A method for wireless communications by an apparatus, comprising: transmitting a MAC-CE comprising an indication to perform one or more actions and an indication of an absolute application time; and based on transmitting the MAC-CE, performing the one or more actions at the absolute application time.

Clause 28: The method of Clause 27, further comprising determining the absolute application time based on at least one of: a number of HARQ transmissions scheduled for use by one or more intended receivers of the MAC-CE, a transmission time between each HARQ transmission scheduled for use by the one or more intended receivers of the MAC-CE, or a timing of a first HARQ transmission scheduled for use by the one or more intended receivers of the MAC-CE.

Clause 29: The method of any one of Clauses 27-28, wherein the indication of the absolute application time comprises an index associated with a frame in a wireless communications frame structure.

Clause 30: The method of any one of Clauses 27-29, wherein the indication of the absolute application time comprises an index associated with a slot in a wireless communications frame structure.

Clause 31: The method of any one of Clauses 27-30, wherein the indication of the absolute application time comprises an index associated with a symbol in a wireless communications frame structure.

Clause 32: The method of any one of Clauses 27-31, wherein the one or more actions comprise at least one of: a secondary cell activation or deactivation, a TCI state switch, an uplink spatial relation switch, or configuring a timing advance.

Clause 33: The method of any one of Clauses 27-32, further comprising transmitting the MAC-CE via multicast signaling.

Clause 34: A method for wireless communications by an apparatus, comprising: transmitting, to a UE, a MAC-CE comprising an indication to perform one or more actions; receiving, from the UE, a HARQ ACK transmission in response to the MAC-CE; determining an application time for performing the one or more actions based on a timing when a first HARQ transmission was received in response to the MAC-CE from the UE and a maximum application time associated with the UE; and performing the one or more actions at the application time.

Clause 35: The method of Clause 34, further comprising determining the maximum application time associated with the UE based on at least one of: a number of HARQ transmissions scheduled for use by the UE in response to the MAC-CE, a transmission time between each HARQ transmission scheduled for use by the UE in response to the MAC-CE, a number of HARQ transmissions scheduled for use by each of one or more other UEs in response to the MAC-CE, a transmission time between each HARQ transmission scheduled for use by each of the one or more other UEs in response to the MAC-CE, or a time difference between the first HARQ transmission scheduled for use by the UE in response to the MAC-CE and a first HARQ transmission scheduled for use by at least one of the one or more other UEs in response to the MAC-CE.

Clause 36: The method of any one of Clauses 34-35, further comprising, prior to receiving the HARQ ACK transmission, transmitting one or more DCI, each DCI scheduling a HARQ transmission in response to the MAC-CE.

Clause 37: The method of Clause 36, wherein each DCI scheduling the HARQ transmission comprises an indication of a number of HARQ transmissions scheduled for use by the UE in response to the MAC-CE.

Clause 38: The method of Clause 37, wherein the indication of the number of HARQ transmissions scheduled for the MAC-CE included in the DCI comprises an RV value associated with an RV pattern associated with HARQ transmissions for the MAC-CE.

Clause 39: The method of Clause 38, wherein the RV pattern associated with the HARQ transmissions for the MAC-CE is defined in a specification.

Clause 40: The method of Clause 38, further comprising transmitting an indication of the RV pattern associated with the HARQ transmissions for the MAC-CE.

Clause 41: The method of Clause 40, further comprising transmitting the indication of the RV in an RRC message.

Clause 42: The method of Clause 37, wherein the indication of the number of HARQ transmissions scheduled for use by the UE in response to the MAC-CE is explicitly indicated in each DCI.

Clause 43: The method of any one of Clauses 34-42, wherein the MAC-CE further comprises an indication of a transmission time between each HARQ transmission scheduled for use by the UE for the MAC-CE.

Clause 44: The method of any one of Clauses 34-43, further comprising, prior to transmitting the HARQ ACK transmission, transmitting an indication of a transmission time between each HARQ transmission scheduled for use by the UE for the MAC-CE in an RRC message.

Clause 45: The method of any one of Clauses 34-44, wherein the MAC-CE further comprises an indication of the maximum application time associated with the UE.

Clause 46: The method of any one of Clauses 34-45, further comprising, prior to receiving the HARQ ACK transmission, transmitting an indication of the maximum application time associated with the UE in an RRC message.

Clause 47: The method of any one of Clauses 34-46, wherein the one or more actions comprise at least one of: a secondary cell activation or deactivation, a TCI state switch, an uplink spatial relation switch, or configuring a timing advance.

Clause 48: The method of any one of Clauses 34-47, further comprising transmitting the MAC-CE via multicast signaling.

Clause 49: One or more apparatuses, comprising: one or more memories comprising executable instructions; and one or more processors configured to execute the executable instructions and cause the one or more apparatuses to perform a method in accordance with any one of clauses 1-48.

Clause 50: One or more apparatuses, comprising means for performing a method in accordance with any one of clauses 1-48.

Clause 51: One or more non-transitory computer-readable media comprising executable instructions that, when executed by one or more processors of one or more apparatuses, cause the one or more apparatuses to perform a method in accordance with any one of clauses 1-48.

Clause 52: One or more computer program products embodied on one or more computer-readable storage media comprising code for performing a method in accordance with any one of clauses 1-48.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." For example, reference to "a processor," "a controller," "a memory," etc., unless otherwise specifically stated, should be understood to refer to "one or more processors," "one or more controllers," "one or more memories," etc. Further, where reference is made in a claim to one or more elements performing functions, it should be understood, unless otherwise specifically stated, that each function need not be performed by each of the one or more elements, but rather the functions may be performed by the one or more elements in a distributed fashion. For example, in a claim with a first processor and a second processor configured to perform a first function and a second function, the first function may be performed by the first processor, the second processor, or both the first processor and the second processor, and the second function may be performed by first processor, the second processor, or both the first processor and the second processor. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus configured for wireless communications, comprising one or more processors, coupled to one or more memories, and configured to cause the apparatus to:

receive a medium access control element (MAC-CE) comprising an indication to perform one or more actions;

transmit a hybrid automatic repeat request (HARQ) acknowledgement (ACK) transmission based on receiving the MAC-CE;

determine an application time for performing the one or more actions based on a number of hybrid automatic repeat request (HARQ) transmissions transmitted in response to the MAC-CE, including the HARQ ACK transmission; and perform the one or more actions at the application time, wherein the one or more processors are configured to cause the apparatus to determine the application time for performing the one or more actions further based on:

a transmission interval measured between each HARQ transmission scheduled for use by the apparatus in response to the MAC-CE;

a maximum application time associated with the apparatus; and an offset from a time when the HARQ ACK transmission is transmitted, wherein the offset is the maximum application time associated with the apparatus minus a product of the transmission interval measured between each HARQ transmission and the number of HARQ transmissions minus one.

2. The apparatus of claim 1, wherein the one or more processors are configured to cause the apparatus to, prior to transmission of the HARQ ACK transmission, receive downlink control information (DCI) scheduling the HARQ ACK transmission.

3. The apparatus of claim 2, wherein:

the DCI scheduling the HARQ ACK transmission comprises an indication of the number of HARQ transmissions, and the one or more processors are configured to cause the apparatus to determine the number of HARQ transmissions based on the indication of the number of HARQ transmissions.

4. The apparatus of claim 3, wherein the indication of the number of HARQ transmissions included in the DCI comprises a redundancy version (RV) value associated with an RV pattern associated with HARQ transmissions for the MAC-CE.

5. The apparatus of claim 4, wherein the one or more processors are configured to cause the apparatus to receive an indication of the RV pattern associated with the HARQ transmissions for the MAC-CE.

6. The apparatus of claim 3, wherein the indication of the number of HARQ transmissions is explicitly indicated in the DCI.

7. The apparatus of claim 1, wherein the MAC-CE further comprises an indication of the transmission interval measured between each HARQ transmission scheduled for use by the apparatus for the MAC-CE.

8. The apparatus of claim 1, wherein the one or more processors are configured to cause the apparatus to, prior to transmission of the HARQ ACK transmission, receive an indication of the transmission interval measured between each HARQ transmission in an RRC message.

9. The apparatus of claim 1, wherein the maximum application time is configured based on at least one of:

a number of HARQ transmissions scheduled for use by the apparatus in response to the MAC-CE, a transmission interval measured between each HARQ transmission scheduled for use by the apparatus in response to the MAC-CE, a number of HARQ transmissions scheduled for use by each of one or more other apparatuses in response to the MAC-CE, a transmission interval measured between each HARQ transmission scheduled for use by each of the one or more other apparatuses in response to the MAC-CE, or a time difference between a first HARQ transmission scheduled for use by the apparatus for the MAC-CE and a first HARQ transmission scheduled for use by at least one of the one or more other apparatuses in response to the MAC-CE.

10. The apparatus of claim 1, wherein the MAC-CE further comprises an indication of the maximum application time associated with the apparatus.

11. The apparatus of claim 1, wherein the one or more processors are configured to cause the apparatus to, prior to transmission of the HARQ ACK transmission, receive an indication of the maximum application time associated with the apparatus in an RRC message.

12. The apparatus of claim 1, wherein the one or more actions comprise at least one of:

a secondary cell activation or deactivation, a transmission configuration indication (TCI) state switch, an uplink spatial relation switch, or configuring a timing advance.

13. The apparatus of claim 1, wherein the one or more processors are configured to cause the apparatus to receive the MAC-CE via multicast signaling.

14. An apparatus configured for wireless communications, comprising one or more processors, coupled to one or more memories, and configured to cause the apparatus to:

transmit, to a user equipment (UE), a medium access control element (MAC-CE) comprising an indication to perform one or more actions;

receive, from the UE, a hybrid automatic repeat request (HARQ) acknowledgement (ACK) transmission in response to the MAC-CE;

determine an application time for performing the one or more actions based on a timing when a first HARQ transmission was received in response to the MAC-CE from the UE and a maximum application time associated with the UE; and perform the one or more actions at the application time, wherein the application time is based on:

a transmission interval measured between each HARQ transmission scheduled for use by the UE in response to the MAC-CE;

a maximum application time associated with the UE; and an offset from a time when the HARQ ACK transmission is transmitted, wherein the offset is the maximum application time associated with the UE minus a product of the transmission interval measured between each HARQ transmission and the number of HARQ transmissions minus one.

15. A method for wireless communications, comprising:

receiving a medium access control element (MAC-CE) comprising an indication to perform one or more actions;

transmitting a hybrid automatic repeat request (HARQ) acknowledgement (ACK) transmission based on receiving the MAC-CE;

determining an application time for performing the one or more actions based on a number of hybrid automatic repeat request (HARQ) transmissions transmitted in response to the MAC-CE, including the HARQ ACK transmission; and performing the one or more actions at the application time, wherein the one or more processors are configured to cause the apparatus to determine the application time for performing the one or more actions further based on:

a transmission interval measured between each HARQ transmission scheduled for use by the apparatus in response to the MAC-CE;

a maximum application time associated with the apparatus; and an offset from a time when the HARQ ACK transmission is transmitted, wherein the offset is the maximum application time associated with the apparatus minus a product of the transmission interval measured between each HARQ transmission and the number of HARQ transmissions minus one.

16. The method of claim 15, comprising: prior to transmitting the HARQ ACK transmission, receiving downlink control information (DCI) scheduling the HARQ ACK transmission.

17. The method of claim 16, wherein:

the DCI scheduling the HARQ ACK transmission comprises an indication of the number of HARQ transmissions, and the method comprises determining the number of HARQ transmissions based on the indication of the number of HARQ transmissions.

18. The method of claim 17, wherein the indication of the number of HARQ transmissions included in the DCI comprises a redundancy version (RV) value associated with an RV pattern associated with HARQ transmissions for the MAC-CE.

19. The method of claim 18, wherein the method comprises receiving an indication of the RV pattern associated with the HARQ transmissions for the MAC-CE.

20. The method of claim 17, wherein the indication of the number of HARQ transmissions is explicitly indicated in the DCI.

21. The method of claim 15, wherein the MAC-CE further comprises an indication of the transmission interval measured between each HARQ transmission scheduled for use by the apparatus for the MAC-CE.

22. The method of claim 15, wherein the method comprises, prior to transmitting the HARQ ACK transmission, receiving an indication of the transmission interval measured between each HARQ transmission in an RRC message.

23. The method of claim 15, wherein the maximum application time is configured based on at least one of:

a number of HARQ transmissions scheduled for use by the apparatus in response to the MAC-CE, a transmission interval measured between each HARQ transmission scheduled for use by the apparatus in response to the MAC-CE, a number of HARQ transmissions scheduled for use by each of one or more other apparatuses in response to the MAC-CE, a transmission interval measured between each HARQ transmission scheduled for use by each of the one or more other apparatuses in response to the MAC-CE, or a time difference between a first HARQ transmission scheduled for use by the apparatus for the MAC-CE and a first HARQ transmission scheduled for use by at least one of the one or more other apparatuses in response to the MAC-CE.

24. The method of claim 15, wherein the MAC-CE further comprises an indication of the maximum application time associated with the apparatus.

25. The method of claim 15, wherein the method comprises, prior to transmitting the HARQ ACK transmission, receiving an indication of the maximum application time associated with the apparatus in an RRC message.

26. The method of claim 15, wherein the one or more actions comprise at least one of:

a secondary cell activation or deactivation, a transmission configuration indication (TCI) state switch, an uplink spatial relation switch, or configuring a timing advance.

27. The method of claim 15, wherein the method comprises receiving the MAC-CE via multicast signaling.

28. A method for wireless communications, comprising:

transmitting, to a user equipment (UE), a medium access control element (MAC-CE) comprising an indication to perform one or more actions;

receiving, from the UE, a hybrid automatic repeat request acknowledgement (ACK) transmission in response to the MAC-CE;

determining an application time for performing the one or more actions based on a timing when a first HARQ transmission was received in response to the MAC-CE from the UE and a maximum application time associated with the UE; and performing the one or more actions at the application time, wherein the application time is based on:

a transmission interval measured between each HARQ transmission scheduled for use by the UE in response to the MAC-CE;

a maximum application time associated with the UE; and an offset from a time when the HARQ ACK transmission is transmitted, wherein the offset is the maximum application time associated with the UE minus a product of the transmission interval measured between each HARQ transmission and the number of HARQ transmissions minus one.

* * * * *